United States Patent
Hirata et al.

(10) Patent No.: US 11,933,980 B2
(45) Date of Patent: Mar. 19, 2024

(54) INFORMATION DISPLAY APPARATUS

(71) Applicants: MAXELL, LTD., Kyoto (JP); Hitachi Industry & Control Solutions, Ltd., Ibaraki (JP)

(72) Inventors: Koji Hirata, Kyoto (JP); Masahiko Yatsu, Kyoto (JP); Toshinori Sugiyama, Kyoto (JP); Kazuomi Kaneko, Ibaraki (JP)

(73) Assignees: MAXELL, LTD., Kyoto (JP); HITACHI INDUSTRY & CONTROL SOLUTIONS, LTD., Ibaraki (JP)

( * ) Notice: Subject to any disclaimer, the term of this patent is extended or adjusted under 35 U.S.C. 154(b) by 0 days.

(21) Appl. No.: 18/139,495

(22) Filed: Apr. 26, 2023

(65) Prior Publication Data

US 2023/0266587 A1    Aug. 24, 2023

Related U.S. Application Data

(60) Continuation of application No. 17/714,280, filed on Apr. 6, 2022, now Pat. No. 11,675,189, which is a
(Continued)

(30) Foreign Application Priority Data

Aug. 30, 2016  (JP) ................. 2016-167819

(51) Int. Cl.
*G02B 27/01* (2006.01)
*B60K 35/00* (2006.01)
(Continued)

(52) U.S. Cl.
CPC .......... *G02B 27/0101* (2013.01); *B60K 35/00* (2013.01); *G02B 5/0891* (2013.01);
(Continued)

(58) Field of Classification Search
CPC ............ G02B 27/0101; G02B 27/0018; G02B 27/0068; G02B 5/10; G02B 5/0891;
(Continued)

(56) References Cited

U.S. PATENT DOCUMENTS 5,907,416 A   5/1999   Hegg et al.
10,437,053 B2  10/2019  Watanabe
(Continued)

FOREIGN PATENT DOCUMENTS

JP   H07-175007 A   7/1995
JP   9-508478 A     8/1997
(Continued)

OTHER PUBLICATIONS

Y. Tanahashi et al., "Development of Full-Color Laser Head-Up Display", Pioneer R&D, vol. 22, 2013.
(Continued)

*Primary Examiner* — Wyatt A Stoffa
*Assistant Examiner* — Mitchell T Oestreich
(74) *Attorney, Agent, or Firm* — Mattingly & Malur, PC

(57) ABSTRACT

The information display apparatus configured to display video information of a virtual image on a reflecting surface of conveyance includes: a display configured to display the video information; and a virtual image optical system configured to display a virtual image at a front of the conveyance by reflecting light emitted from the display by means of the reflecting surface. The virtual image optical system includes a concave mirror and an optical element. The optical element is arranged between the display and the concave mirror, and is configured to correct distortion of the virtual image obtained so as to correspond to a viewpoint position of a driver on a basis of a shape of the concave mirror and a shape of the optical element. The information display apparatus further includes a virtual image double
(Continued)

image conversion reducer configured to reduce double image conversion of the virtual image.

5 Claims, 21 Drawing Sheets

Related U.S. Application Data division of application No. 16/328,985, filed as application No. PCT/JP2017/023187 on Jun. 23, 2017, now Pat. No. 11,327,303.

(51) Int. Cl.
*G02B 5/08* (2006.01)
*G02B 5/10* (2006.01)
*G02B 27/00* (2006.01)

(52) U.S. Cl.
CPC ............ *G02B 5/10* (2013.01); *G02B 27/0018* (2013.01); *G02B 27/0068* (2013.01); *B60K 2370/334* (2019.05); *G02B 2027/011* (2013.01); *G02B 2027/0118* (2013.01)

(58) Field of Classification Search
CPC ...... G02B 2027/011; G02B 2027/0118; B60K 35/00; B60K 2370/334
USPC .......................................................... 359/630
See application file for complete search history.

(56) References Cited

U.S. PATENT DOCUMENTS

| | | |
|---|---|---|
| 2004/0113866 A1 | 6/2004 | Aoki et al. |
| 2006/0209419 A1* | 9/2006 | Dobschal ............ G02B 27/0101 359/630 |
| 2012/0099032 A1 | 4/2012 | Ishikawa |
| 2014/0184996 A1 | 7/2014 | Matsushita et al. |
| 2016/0195719 A1 | 7/2016 | Yonetani |
| 2016/0202480 A1 | 7/2016 | Kuzuhara |
| 2017/0082854 A1 | 3/2017 | Watanbe |

FOREIGN PATENT DOCUMENTS

| | | |
|---|---|---|
| JP | 2007-086387 A | 4/2007 |
| JP | 2012-093506 A | 5/2012 |
| JP | 2013-057897 A | 3/2013 |
| JP | 2014-010321 A | 1/2014 |
| JP | 2014-119719 A | 6/2014 |
| JP | 2004-130892 A | 7/2014 |
| JP | 2015-194707 A | 11/2015 |
| JP | 2015-230329 A | 12/2015 |
| JP | 2016-133700 A | 7/2016 |
| WO | 95/21396 A2 | 8/1995 |
| WO | 2015/098078 A1 | 7/2015 |
| WO | 2015/186488 A1 | 12/2015 |

OTHER PUBLICATIONS

International Search Report for PCT/JP2017/023187, dated Sep. 19, 2017.
Japanese Office Action received in corresponding Japanese Application No. 2020-150954 dated Jul. 6, 2021.
Japanese Office Action received in corresponding Japanese Application No. 2016-167819 dated May 26, 2020.

\* cited by examiner

FIG. 6
(a)
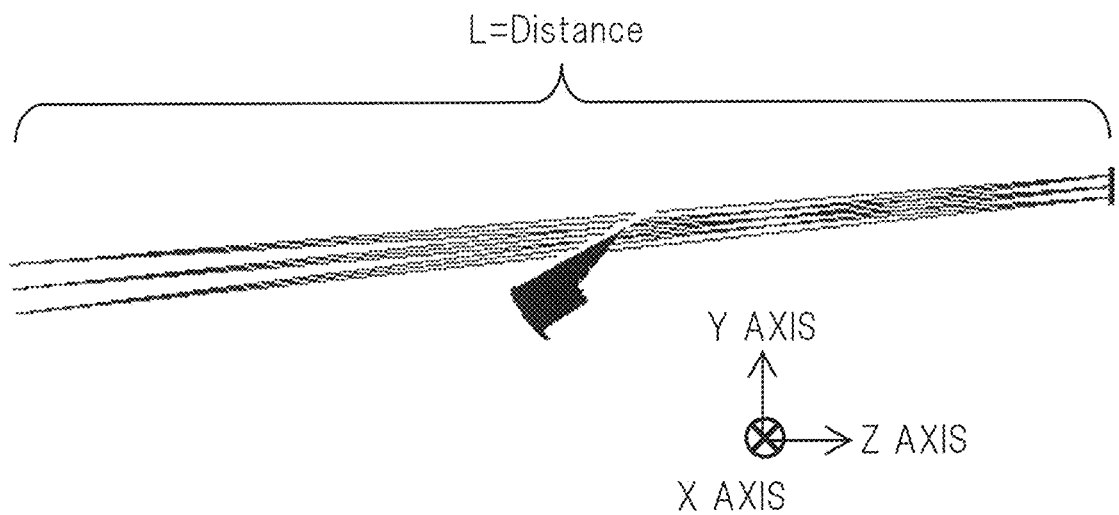
(b)
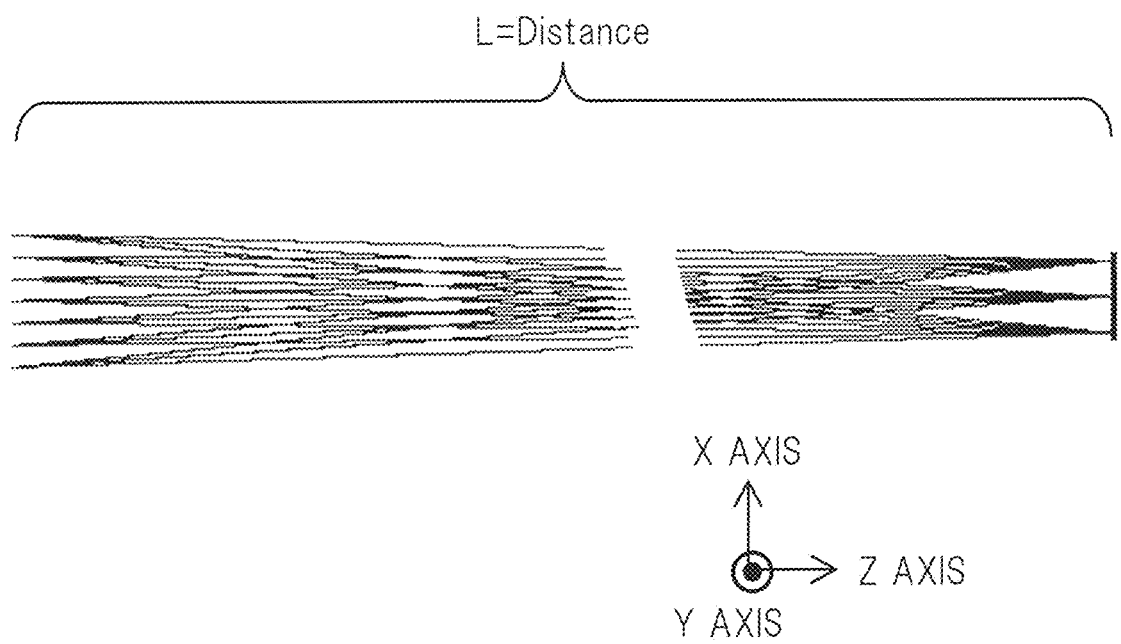

FIG. 12
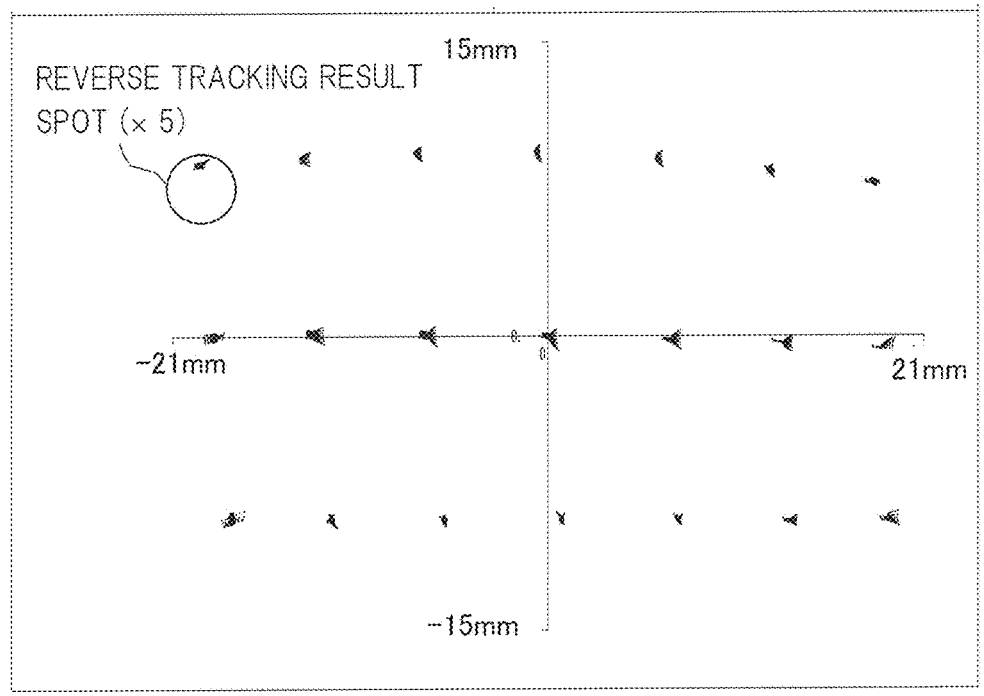
FIG. 13
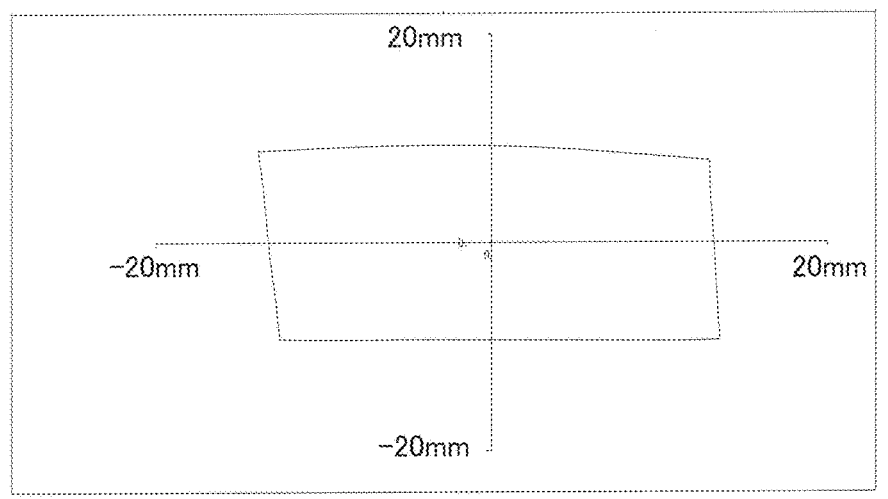
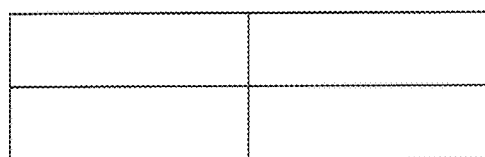

FIG. 14

| NAME | SURFACE NUMBER | SHAPE | RADIUS OF CURVATURE | DISTANCE BETWEEN SURFACES | NAME OF GRASS MATERIAL | CONTENT OF ECCENTRICITY AND FALLING | ECCENTRICITY (mm) | | | FALLING (°) | | |
|---|---|---|---|---|---|---|---|---|---|---|---|---|
| | | | | | | | X AXIS | Y AXIS | Z AXIS | AROUND X AXIS | AROUND Y AXIS | AROUND Z AXIS |
| OBJECTIVE SURFACE VIRTUAL IMAGE | ZEROTH SURFACE | PLANE | ∞ | 2000 | | | 0 | 0 | 0 | 0 | 0 | 0 |
| INCIDENT PUPIL | FIRST SURFACE | PLANE | ∞ | -784.68 | | NORMAL ECCENTRICITY | 0 | 0 | 0 | -5.08 | 0 | 0 |
| MIRROR M1 | SECOND SURFACE | FREEFORM SURFACE | ∞ | 0 | REFLECTION | DECENTER & RETURN | 380 | -0.1 | -46.3 | 0 | 0 | 0 |
| DUMMY SURFACE | THIRD SURFACE | PLANE | ∞ | 358.031 | | NORMAL ECCENTRICITY | 0 | 0 | 0 | -145.213 | 6.013 | 0 |
| MIRROR M2 | FOURTH SURFACE | FREEFORM SURFACE | -411.356 | 0 | REFLECTION | DECENTER & RETURN | 0 | 0 | 0 | -23.020 | 13.448 | 43.578 |
| DUMMY SURFACE | FIFTH SURFACE | PLANE | ∞ | -121.330 | | NORMAL ECCENTRICITY | 0 | 0 | 0 | -32.726 | 22.671 | 0 |
| FREEFORM SURFACE LENS | SIXTH SURFACE | FREEFORM SURFACE | ∞ | -5 | MPCD4_ HOYA | NORMAL ECCENTRICITY | 0 | 0 | 0 | 31.191 | -25.774 | -14.251 |
| | SEVENTH SURFACE | FREEFORM SURFACE | ∞ | -12.740 | | | 0 | 0 | 0 | 0.000 | 0.000 | 0 |
| POLARIZING PLATE | EIGHTH SURFACE | PLANE | ∞ | -0.122 | 50.30 | NORMAL ECCENTRICITY | 0.796 | -2.830 | 0 | -2.340 | -0.363 | 10.237 |
| | NINTH SURFACE | PLANE | ∞ | 0.000 | | | 0 | 0 | 0 | 0 | 0 | 0 |
| COVER GLASS | TENTH SURFACE | PLANE | ∞ | -0.6 | 52.60 | | 0 | 0 | 0 | 0.000 | 0.000 | 0.000 |
| | ELEVENTH SURFACE | PLANE | ∞ | 0 | | | 0 | 0 | 0 | 0 | 0 | 0 |
| IMAGE PLANE LCD | TWELFTH SURFACE | PLANE | ∞ | 0 | | | 0 | 0 | 0 | 0 | 0 | 0 |

FIG. 15

| CODE | | MIRROR SURFACE (SECOND SURFACE) | MIRROR SURFACE (FOURTH SURFACE) | LENS SURFACE (SIXTH SURFACE) | LENS SURFACE (SEVENTH SURFACE) |
|---|---|---|---|---|---|
| K | K | 0.00000 | 0.49008 | | |
| C2 | $x$ | | −3.47837E−01 | 6.44151E−02 | 3.25369E−03 |
| C3 | $y$ | 1.92070E+00 | −1.07623E−01 | −1.49973E−01 | 2.05829E−02 |
| C4 | $x^2$ | 2.83990E−04 | −6.75914E−04 | −1.79872E−03 | −1.61261E−02 |
| C5 | $xy$ | | −6.24836E−05 | −1.24009E−02 | −1.21908E−02 |
| C6 | $y^2$ | 7.81820E−04 | −6.62423E−04 | 2.85052E−02 | 1.18632E−02 |
| C7 | $x^3$ | | −3.39361E−06 | −1.76706E−05 | −1.00162E−05 |
| C8 | $x^2y$ | 5.33890E−07 | 3.57870E−06 | 3.16602E−05 | 1.27511E−04 |
| C9 | $xy^2$ | | −5.51570E−07 | 6.17229E−05 | −1.15519E−04 |
| C10 | $y^3$ | 1.44540E−07 | −1.61113E−07 | 4.19653E−04 | 8.65250E−04 |
| C11 | $x^4$ | 3.12850E−10 | −1.15981E−08 | −4.58613E−06 | −2.56701E−06 |
| C12 | $x^3y$ | | −1.64942E−08 | 3.28663E−06 | −3.97958E−06 |
| C13 | $x^2y^2$ | 1.29950E−10 | −4.32700E−08 | −3.92225E−05 | −6.86772E−06 |
| C14 | $xy^3$ | | −1.20404E−08 | 3.08209E−05 | 2.31208E−05 |
| C15 | $y^4$ | −5.24300E−09 | −3.08461E−09 | −2.79950E−05 | 1.02974E−05 |
| C16 | $x^5$ | | −5.45321E−11 | 4.74443E−08 | −2.19416E−07 |
| C17 | $x^4y$ | −6.35040E−13 | −2.23431E−10 | −2.06569E−07 | 2.40048E−07 |
| C18 | $x^3y^2$ | | −1.39688E−10 | −2.87100E−07 | −5.99276E−07 |
| C19 | $x^2y^3$ | 4.24900E−12 | −8.46957E−11 | −1.56020E−07 | −1.22508E−06 |
| C20 | $xy^4$ | | 7.12726E−12 | −3.35383E−07 | 1.20047E−06 |
| C21 | $y^5$ | −1.63760E−13 | −6.19277E−12 | −1.51547E−07 | −2.11215E−06 |
| C22 | $x^6$ | −6.21710E−16 | 3.01556E−14 | 7.76816E−10 | −1.84851E−08 |
| C23 | $x^5y$ | | 3.11794E−12 | 8.41607E−09 | −5.24588E−08 |
| C24 | $x^4y^2$ | 5.30230E−16 | 4.27429E−12 | 4.46177E−10 | −7.48849E−08 |
| C25 | $x^3y^3$ | | 4.43189E−12 | −1.65101E−08 | −1.71260E−08 |
| C26 | $x^2y^4$ | 8.86800E−14 | 2.24910E−12 | −6.64659E−09 | −4.61582E−09 |
| C27 | $xy^5$ | | 1.13184E−12 | −3.14009E−08 | −1.50883E−07 |
| C28 | $y^6$ | 1.22860E−13 | 4.25753E−13 | 1.65603E−08 | −7.14183E−08 |
| C29 | $x^7$ | | 7.53109E−17 | 1.53886E−11 | 3.32510E−10 |
| C30 | $x^6y$ | 3.80480E−18 | −9.15138E−18 | 6.02638E−11 | −2.98427E−09 |
| C31 | $x^5y^2$ | | 1.20734E−15 | 4.24676E−10 | 1.56368E−08 |
| C32 | $x^4y^3$ | −5.15920E−18 | −8.11467E−17 | −9.27379E−10 | −4.66892E−09 |
| C33 | $x^3y^4$ | | 2.57537E−15 | 2.41049E−09 | −9.09777E−09 |
| C34 | $x^2y^5$ | 1.25060E−16 | 1.12596E−15 | −2.91497E−09 | 1.23055E−08 |
| C35 | $xy^6$ | | −7.12608E−18 | 5.57495E−10 | −4.55492E−09 |
| C36 | $y^7$ | −3.47380E−16 | 2.37217E−16 | −1.02328E−09 | −4.37386E−09 |
| C37 | $x^8$ | 1.41220E−21 | −1.07275E−18 | −3.35662E−13 | 1.08886E−11 |
| C38 | $x^7y$ | | −9.53657E−20 | −2.80368E−12 | 1.20515E−10 |
| C39 | $x^6y^2$ | 1.60140E−20 | −9.53116E−20 | 1.06532E−11 | −1.94568E−10 |
| C40 | $x^5y^3$ | | 7.01893E−18 | 1.89856E−11 | 9.20189E−10 |
| C41 | $x^4y^4$ | −4.78450E−19 | 8.50516E−18 | −2.02553E−11 | 1.77343E−10 |
| C42 | $x^3y^5$ | | −3.87370E−18 | 1.52851E−11 | −6.48402E−10 |
| C43 | $x^2y^6$ | −2.07340E−18 | 1.01918E−17 | 1.12714E−10 | 2.07447E−10 |
| C44 | $xy^7$ | | 1.75602E−17 | −1.13799E−10 | 1.75887E−10 |
| C45 | $y^8$ | −2.16160E−18 | −1.83103E−18 | −5.96462E−12 | −7.70169E−11 |
| C46 | $x^9$ | | −1.84302E−20 | −1.63383E−14 | 1.08564E−13 |
| C47 | $x^8y$ | −4.78040E−24 | −5.04191E−21 | −3.38144E−14 | 2.31725E−12 |
| C48 | $x^7y^2$ | | 4.47422E−21 | 5.0341E−13 | −2.76698E−11 |
| C49 | $x^6y^3$ | −4.24990E−23 | 1.04111E−20 | −2.60755E−12 | 5.77112E−11 |
| C50 | $x^5y^4$ | | −2.81567E−19 | 3.71287E−12 | −1.29428E−10 |
| C51 | $x^4y^5$ | −2.97720E−21 | 4.11028E−21 | 8.3176E−13 | 2.26681E−11 |
| C52 | $x^3y^6$ | | 1.29903E−19 | 7.87606E−14 | 6.10328E−11 |
| C53 | $x^2y^7$ | −5.12040E−21 | 1.99125E−19 | −5.07228E−12 | 1.89001E−11 |
| C54 | $xy^8$ | | −1.61299E−20 | 2.38231E−12 | −4.25378E−12 |
| C55 | $y^9$ | 1.88170E−20 | −5.58933E−21 | −3.39566E−12 | 5.45689E−12 |
| C56 | $x^{10}$ | −1.39350E−27 | −1.60685E−22 | 3.34137E−16 | 8.86398E−15 |
| C57 | $x^9y$ | | −1.41829E−22 | 5.10301E−16 | 5.07108E−14 |
| C58 | $x^8y^2$ | −3.39430E−26 | 1.75547E−22 | −1.64554E−14 | 6.05054E−13 |
| C59 | $x^7y^3$ | | 5.80508E−23 | 5.94245E−14 | −3.08691E−12 |
| C60 | $x^6y^4$ | −5.30780E−26 | −8.26102E−23 | −1.46481E−13 | 4.09082E−12 |
| C61 | $x^5y^5$ | | 3.80188E−21 | 8.37901E−14 | −7.09752E−12 |
| C62 | $x^4y^6$ | −6.10680E−24 | 1.75737E−21 | 8.64788E−14 | 4.02438E−13 |
| C63 | $x^3y^7$ | | −1.15368E−21 | −2.81688E−14 | 3.50699E−12 |
| C64 | $x^2y^8$ | 1.02510E−23 | 1.33485E−22 | 2.23011E−15 | 1.94979E−12 |
| C65 | $xy^9$ | | −1.195E−22 | −2.89622E−13 | −4.79931E−13 |
| C66 | $y^{10}$ | 7.15920E−23 | 7.41941E−23 | 5.85804E−14 | 1.1295E−23 |

Enlarged view of B portion    Enlarged view of A portion

Reflection factor of glass with respect to
P-polarized light and S-polarized light

INFORMATION DISPLAY APPARATUS

TECHNICAL FIELD

The present invention relates to an information display apparatus that projects that projects an image on a windshield or a combiner of a vehicle, an electric train, an airplane or the like (hereinafter, generally referred to as "conveyance"). The present invention also relates to a projection optical system in which an image is observed through the windshield as a virtual image and an information display apparatus using the same.

BACKGROUND ART

A so-called head up display (HUD: Head Up Display) apparatus has already been known by Patent Document 1 below. The head up display apparatus projects video light onto a windshield or a combiner of a vehicle to form a virtual image, thereby displaying traffic information such as route information or traffic jam information and vehicle information such as a remaining amount of fuel or cooling water temperature thereon.

In this type of information display apparatus, it is desired that a region that a driver can view a virtual image is enlarged. However, it is an important performance factor that a virtual image has high resolution and high visibility.

A head up display apparatus necessarily requires a windshield or combiner as a final reflecting surface by which a virtual image is provided to a driver. The inventors of the present application noticed that improvement of a double image of a virtual image, which is generated by double reflection that occurs on the windshield or combiner as the final reflecting surface, was important in order to obtain good resolution performance with high visibility.

On the other hand, for example, an apparatus whose body including a combiner is attached to the vicinity of a ceiling (or a sun visor) of a vehicle as also disclosed in Non-Patent Document 1 below has already been proposed.

RELATED ART DOCUMENTS

Patent Documents

Patent document 1: Japanese Unexamined Patent Application Publication No. 2015-194707

Non-Patent Documents

Non-Patent document 1: PIONEER R&D (Vol. 22, 2013)

SUMMARY OF THE INVENTION

Problems to be Solved by the Invention

As shown in FIG. 33, a principle of generation of a virtual image by a concave mirror to realize a head up display apparatus according to a conventional technique arranges an object point AB at an inner side of a focal point F (focal point distance f) with respect to a point O on an optical axis of a concave mirror 1', thereby allowing the virtual image by the concave mirror 1' to be obtained. In FIG. 33, for convenience of explanation, the concave mirror 1' is regarded as a convex lens with the same positive refractive power, and a relationship among an object point, the convex lens (described by the concave mirror in FIG. 33 for convenience of explanation), and the virtual image to be generated is shown.

In the conventional technique, in order to enlarge a size of the virtual image to be generated on the concave mirror 1', the object point AB may be caused to approach the focal point F and the concave mirror may be enlarged with respect to an object size AB. However, in order to obtain desired magnification, a radius of curvature of the concave mirror becomes smaller. Thus, it is difficult to establish both of these. As a result, a mirror size becomes smaller, and this results in a state where only a virtual image whose magnification power is effectively large but a viewable range is small can be obtained. For this reason, in order to satisfy (1) a desired size of a virtual image, and (2) necessary magnification of the virtual image M=b/a at the same time, it is necessary that a dimension of the concave mirror is fitted to a viewing range and magnification of the virtual image is determined in view of a video display apparatus.

For this reason, in the conventional technique, in order to obtain a large virtual image in a desired view range, for example, as illustrated in FIG. 33, a distance from the concave mirror 1' to a virtual image needed to be enlarged. Namely, there was necessary that a distance between the windshield or combiner (not illustrated in the drawings) as the final reflecting surface and the concave mirror is to be enlarged and a size of the concave mirror is to be enlarged at the same time. However, in the conventional technique, a double image of a virtual image generated by double reflection that occurs on a windshield or combiner has never been considered.

Further, for example, in the example of the head up display apparatus disclosed in Patent Document 1 described above, which is the conventional technique, the head up display apparatus includes a device configured to display an image and a projection optical system configured to project the image displayed by the display device. The projection optical system includes a first mirror and a second mirror on an optical path of a viewer from the display device. Miniaturization is realized by satisfying predetermined conditions for a relationship among an incident angle of the first mirror in a long axis direction of the image, an incident angle of the first mirror in a short axis direction of the image, an interval between an image display surface of the display device and the first mirror, and a width of a virtual image viewed and recognized by the viewer in a horizontal direction. However, means for reducing the double image described above, which is generated by reflection of both surfaces of a windshield (two surfaces at a driver's side and an outside) is not described in Patent document 1.

On the other hand, in an apparatus whose body is attached to the vicinity of a ceiling (or a sun visor) of a vehicle as disclosed in Non-Patent document 1, generation of a double image is reduced by forming antireflection coating on a reflecting surface to which a driver does not face. However, problems on safety still remains such as a possibility that a driver may get an injury in a case where a collision accident occurs and an HUD apparatus thereby comes off.

For this reason, it is thought that a system in which a windshield is used as a reflecting surface disclosed in Patent document 1 described above becomes mainstream in the future. Therefore, technical means for reducing reflection of video light generated by virtual images that are reflected by both surfaces of a windshield by means of contrivance of a projection optical system has been invented.

The present invention including technical means for reducing conversion from a virtual image to a double image (hereinafter, referred to as "double image conversion"), which may be generated in a case where a windshield is used as a reflecting surface (will be described below in detail), by contrivance of an optical system is proposed. In addition, it is an object of the present invention to provide an information display apparatus capable of forming a virtual image with high visibility in which distortion and aberration of the virtual image viewed and recognized by a driver are reduced up to a level practically having no problem.

Means for Solving the Problem

One example of the present invention that is made in order to achieve the object described above is an information display apparatus configured to display video information of a virtual image on a reflecting surface of conveyance, the information display apparatus including: a display configured to display the video information; and a virtual image optical system configured to display a plurality of virtual images at a front of the conveyance by reflecting light emitted from the display by means of the reflecting surface. The virtual image optical system includes a concave mirror and an optical element. The optical element optimizes a shape and a position of the optical element in accordance with a video light flux in which each of the virtual images separated between the display and the concave mirror is established so that a virtual image such as risk information to be superimposed on a distant view, for example, is established at an upper portion of the reflecting surface and a virtual image such as speed information or an arrow indicating a traveling direction of navigation to be superimposed on a near view or a hood of a vehicle is established from the upper portion of the reflecting surface toward a lower portion thereof. By providing means for reducing double image conversion of a virtual image occurring due to reflection of the video light flux by a front surface and a back surface of the reflecting surface, the plurality of virtual images is formed at a plurality of positions corresponding to a viewpoint position of a driver while reducing a size thereof.

Thus, according to the present invention, an information display apparatus that controls a divergent angle of light incident on an optical system of video light from a video display apparatus so as to reduce a double image generated in the virtual image described above and obtain video whose visibility is improved is realized.

Effects of the Invention

According to the present invention, it becomes possible to provide an information display apparatus that forms a virtual image whose visibility is improved while realizing miniaturization of the apparatus by controlling a divergent angle of a light source light flux incident on a virtual image optical system in order to correct distortion and/or aberration of the virtual image observed by a driver and reduce a double image generated in the virtual image.

BRIEF DESCRIPTIONS OF THE DRAWINGS

FIG. 6 is a ray diagram of the whole virtual image optical system in the information display apparatus according to the embodiment;

FIG. 12 is a spot diagram illustrating a reverse tracking result by a green ray indicating a result of resolution performance evaluation according to the embodiment (an image forming state at a video source is evaluated by flying a ray from a virtual image);

FIG. 13 is a view illustrating distortion performance according to the embodiment when viewed from a center of the EyeBox;

FIG. 14 is lens data according to the embodiment;

FIG. 15 is lens data according to the embodiment;

DETAILED DESCRIPTION OF EMBODIMENTS

Figure 1:
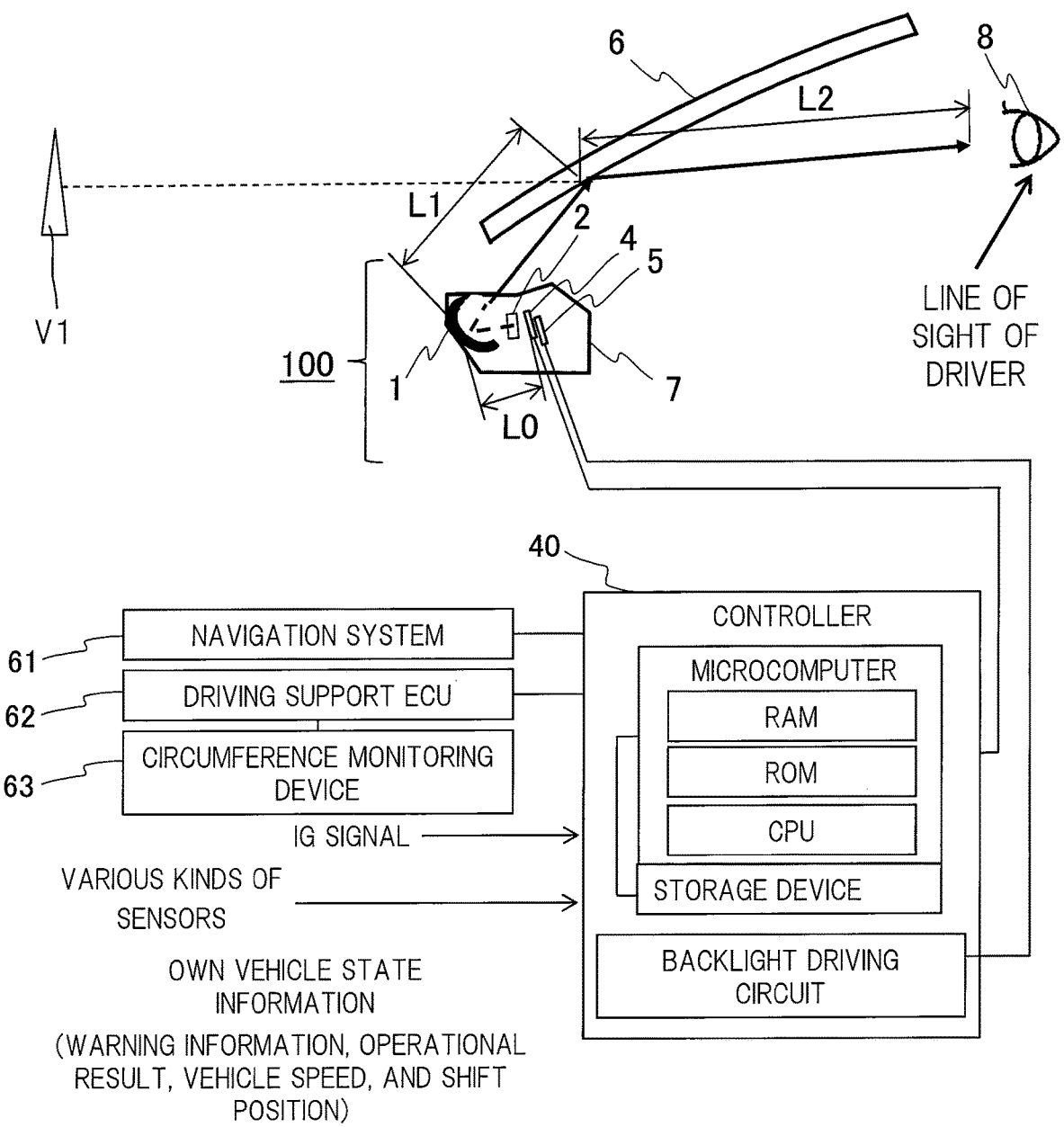
FIG. 1 is a schematic configuration diagram illustrating a peripheral equipment configuration of an information display apparatus according to an embodiment.

Hereinafter, embodiments of the present invention will be described in detail with reference to the drawings and the like. Note that the present invention is not limited to the following explanation, and various changes and modifications can be made by a person having ordinary skill in the art within a scope of technical ideas disclosed in the present specification. Further, in all of the drawings for explaining the present invention, the same reference numeral may be attached to a component having the same function, and repeated explanation may be omitted.

Embodiments of Information Display Apparatus

FIG. 1 is a block diagram and a schematic configuration diagram illustrating a peripheral equipment configuration of an information display apparatus according to one embodiment of the present invention. Here, an information display apparatus 100 configured to project an image onto a windshield of a vehicle will be described particularly as one example thereof.

This information display apparatus 100 is an apparatus (that is, a so-called HUD (Head Up Display)) configured to display, as a virtual image VI (Virtual Image), various kinds of information that are reflected by a projected member 6 (in the present embodiment, an inner surface of the windshield) in order to form a virtual image V1 at a front side of an own vehicle along a line of sight 8 of a driver. In this regard, the projected member 6 may be a member on which information is projected, and it maybe not only the windshield described above, but also a combiner. Namely, in the information display apparatus 100 according to the present embodiment, the projected member 6 may be a member that allows the driver to view (and recognize) a virtual image that is formed at the front side of the own vehicle along the line of sight 8 the driver. As a matter of course, vehicle information, and information on the foreground photographed by cameras (not shown in the drawings), such as a monitoring camera or an around viewer, are contained as the information to be displayed as the virtual image, for example.

Further, the information display apparatus 100 includes a video display apparatus 4, a concave mirror 1, and a group of lenses 2 for correction provided between the video display apparatus 4 and the concave mirror 1. The video display apparatus 4 is configured to project video light to display information. The group of lenses 2 is configured to correct distortion and/or aberration that occurs when a virtual image is formed by a concave mirror 1 from video displayed by the video display apparatus 4.

The information display apparatus 100 also includes a controller 40 configured to control the video display apparatus 4 described above and a backlight 5. Note that optical components including the video display apparatus 4 and the backlight 5 described above is a virtual image optical system, which will be described later, and includes the mirror concave 1, which reflects light. Further, the light reflected by these optical components is reflected by the projected member 6 to go toward the line of sight 8 of the driver (EyeBox: which will be described later).

As the video display apparatus 4 described above, for example, there are a light emitting VFD (Vacuum Fluorescent Display) and the like in addition to an LCD (Liquid Crystal Display) having a backlight.

On the other hand, in place of the video display apparatus 4 described above, video may be displayed on a screen by a projection apparatus, a virtual image may be formed therefrom by the concave mirror 1 described above and reflected by a windshield 6 that is the projected member to direct to the line of sight 8 of the driver.

As such a screen, for example, the screen may be configured by a microlens array in which microlenses are arranged thereon in a two-dimensional manner.

Here, in order to reduce distortion of the virtual image, a shape of the concave mirror 1 may have a shape in which a radius of curvature at an upper portion shown in FIG. 1 (that is, an area where a ray is reflected at a lower part of the windshield 6 at which a distance from a viewpoint of the driver is relatively short) so that magnification power thereof becomes larger is relatively small, and a radius of curvature at a lower portion thereof (that is, an area where a ray is reflected at an upper part of the windshield 6 at which a distance from the viewpoint of the driver is relatively long) so that magnification power thereof becomes smaller is relatively large. Further, a difference of virtual image magnifications described above is corrected by inclining the video display apparatus 4 with respect to an optical axis of the concave mirror to reduce distortion itself that may occur, whereby good correction can further be realized.

Figure 2:
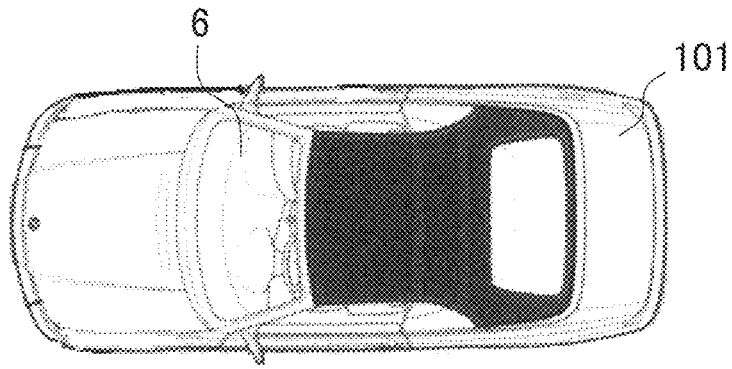
FIG. 2 is a top view of a vehicle on which the information display apparatus is mounted.
Figure 3:
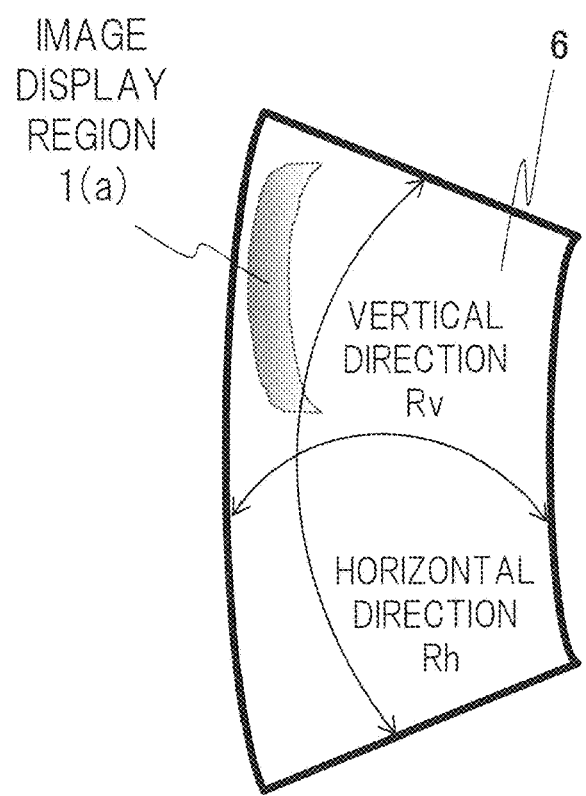
FIG. 3 is a view for explaining a difference of a radius of curvature of a windshield.

On the other hand, as shown in FIG. 2 and FIG. 3, with respect to the windshield 6 of the vehicle, a radius of curvature Rv in a vertical direction of a body thereof is different from a radius of curvature Rh in a horizontal direction, and they generally have a relationship of Rh>Rv. For this reason, when the windshield 6 is grasped as a reflecting surface, it becomes a toroidal surface of the concave mirror. For this reason, in the information display apparatus 100 of the present embodiment, the shape of the concave mirror 1 may have different average radii of curvature between the horizontal direction and the vertical direction so as to correct the virtual image magnification by a shape of the windshield 6, that is, so as to correct a difference between the radii of curvature in the vertical direction and the horizontal direction of the windshield 6. In this case, in a case where the shape of the concave mirror 1 is a spherical or aspherical shape symmetric about the optical axis (that is, a shape expressed by Formula 2, which will be described later), it becomes a function of a distance r from the optical axis, a horizontal cross-sectional shape and a vertical cross-sectional shape of separated places cannot be controlled individually. Therefore, it is preferable to correct the difference as a function of a coordinate (x, y) on a surface from the optical axis of a mirror surface as a free-form surface expressed by Formula 1 (will be described later).

The explanation returns to FIG. 1 again. A lens element 2 is further arranged between the video display apparatus 4 and the concave mirror 1 as a transmissive optical component, for example. By controlling an emission direction of the ray to the concave mirror 1, aberration correction of the virtual image including astigmatism that occurs due to the difference between the radius of curvature in the horizontal direction and the radius of curvature in the vertical direction of the windshield 6 described above is realized at the same time as correction of distortion aberration is carried out in accordance with the shape of the concave mirror 1.

Further, in order to further heighten aberration correction capability, an optical element 2 as described above may be constituted by a plurality of lenses. Alternatively, by arranging a curved mirror in place of the lens element and controlling an incident position of the ray to the concave mirror 1 at the same time of folding of the optical path, it is possible to reduce distortion aberration. As described above, it goes without saying that it does not depart from technical ideas or a range of the present invention even though an optical element optimally designed to improve the aberration correction capability is further provided between the concave mirror 1 and the video display apparatus 4. Moreover, by changing a thickness of the optical element 2 described above in an optical axis direction, an optical distance between the concave mirror 1 and the video display apparatus 4 can be changed in addition to true aberration correction, whereby it is possible to continuously change a display position of the virtual image from a distant place to an adjacent position.

Further, by arranging the video display apparatus 4 so as to incline the same with respect to a normal line of the optical axis of the concave mirror 1, the difference of magnifications of the virtual image in the vertical direction may be corrected.

On the other hand, as a factor to deteriorate image quality of the information display apparatus 100, there is known a fact that a video light ray emitted from the video display apparatus 4 toward the concave mirror 1 is reflected by a surface of the optical element 2 arranged in the middle to return to the video display apparatus 4, and is then reflected again to be superimposed on true video light, whereby the image quality thereof is deteriorated. For this reason, in the present embodiment, it is preferable that the information display apparatus 100 is designed so that not only antireflection coating is formed on the surface of the optical element 2 to suppress the reflection, but also a lens surface shape of any one or both of an incident surface and an emission surface of the optical element 2 for the video light is caused to have restriction for the surface shape to become a shape so that the reflected light described above does not focus on apart of the video display apparatus 4 (for example, a shape in which a concave surface faces the video display apparatus 4).

Figure 27:
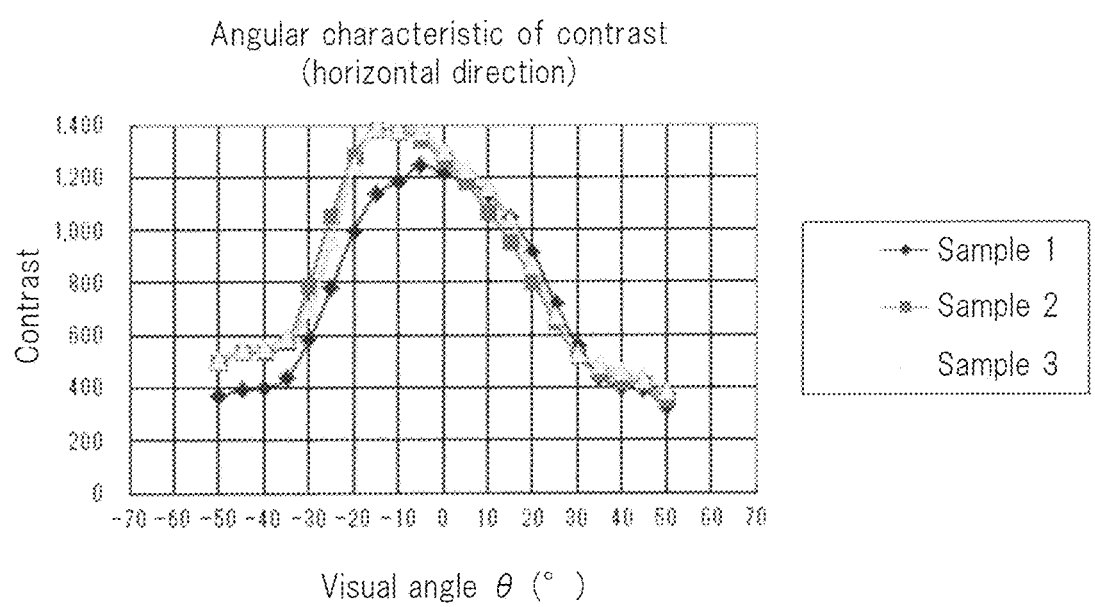
FIG. 27 is a characteristic diagram illustrating an angular characteristic of contrast in the horizontal direction of the liquid crystal panel.
Figure 31:
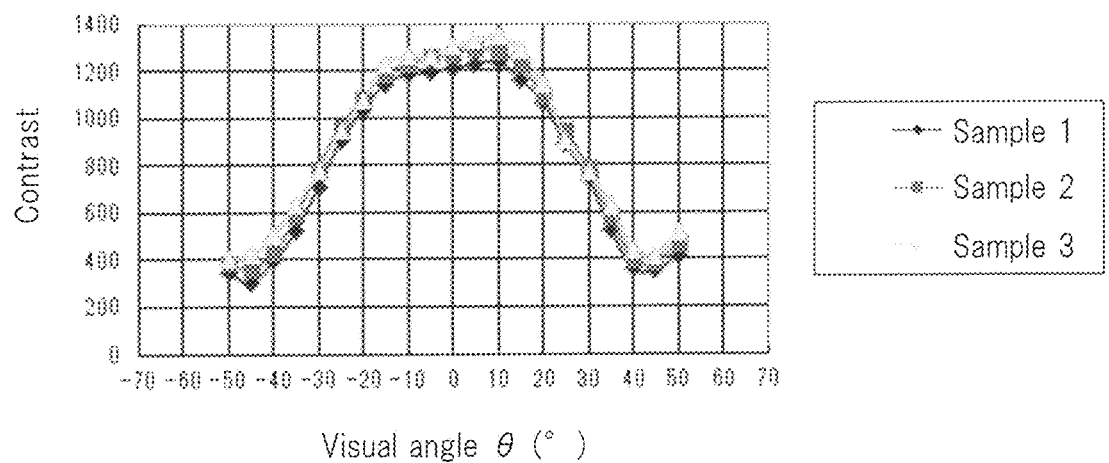
FIG. 31 is a characteristic diagram illustrating an angular characteristic of the contrast in the vertical direction of the liquid crystal panel.
Figure 32:
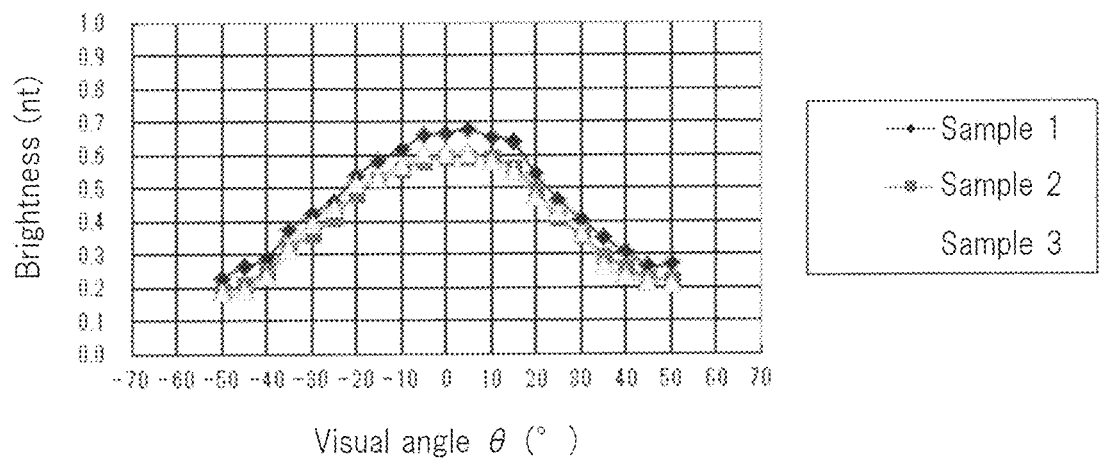
FIG. 32 is a characteristic diagram illustrating an angular characteristic of the black display brightness in the vertical direction of the liquid crystal panel.
Figure 33:
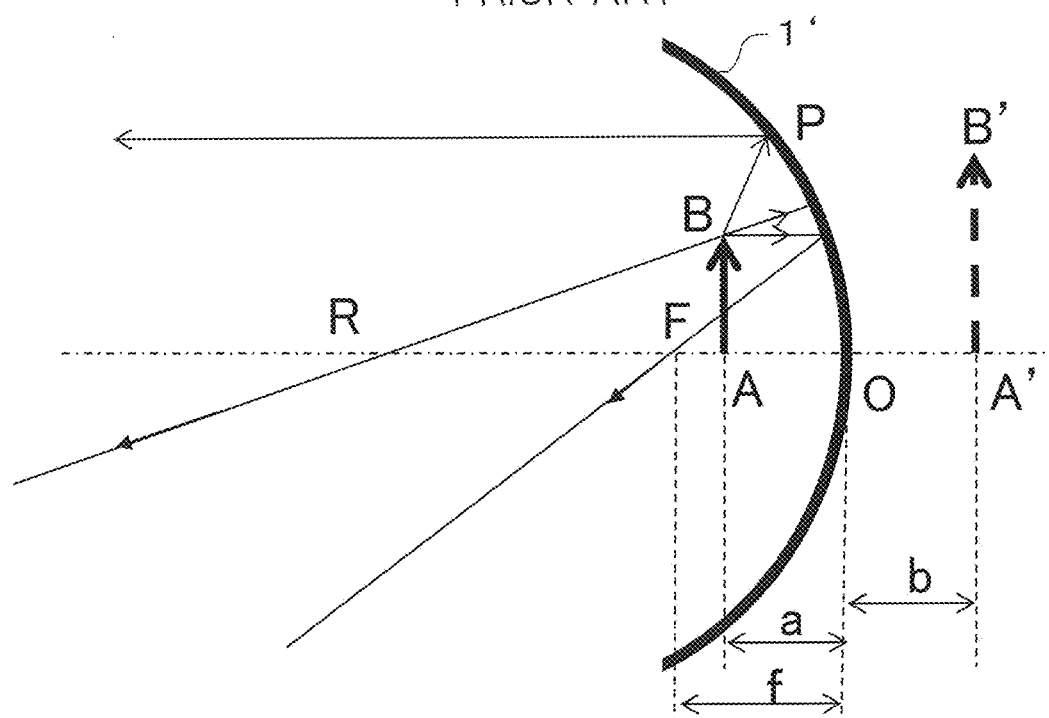
FIG. 33 is a schematic view for explaining a principle of a virtual image optical system according to a conventional technique.

Next, in a case where, as the video display apparatus 4, a second polarizing plate is arranged so as to be separated from a liquid crystal panel in addition to a first polarizing plate arranges in proximity to the liquid crystal panel in order to absorb the reflected light from the optical element 2 described above, it is possible to reduce deterioration in image quality. Further, the backlight 5 of the liquid crystal panel is controlled so that an incident direction of light incident on the liquid crystal panel 4 efficiently enters an incident eye of the concave mirror 1. At this time, by making a divergent angle of a light flux incident on the liquid crystal panel smaller, it becomes possible to not only effectively direct video light toward eye points of the driver, but also obtain video with high contrast and good visibility as illustrated in FIG. 27 and FIG. 31. Contrast performance in the horizontal direction with respect to the divergent angle of the video is remarkable. When a visual angle is within ±20, an excellent property can be obtained. In order to further improve the contrast performance, a light flux whose visual angle is within ±10° may be used.

On the other hand, it is preferable that a solid light source with long product lifetime is adopted as the light source. Moreover, it is preferable that polarization conversion is carried out by using a PBS (Polarizing Beam Splitter) in which optical means for reducing a divergent angle of light as LED (Light Emitting Diode) whose change in light output with respect to variation in ambient temperature is small is provided.

Polarizing plates are respectively arranged at the backlight 5 side (light incident surface) and the optical element 2 side (light emission surface) of the liquid crystal panel. This makes it possible to heighten a contrast ratio of the video light. In a case where iodine-based one in which the degree of polarization is high is adopted for the polarizing plate provided at the backlight 5 side (light incident surface), a high contrast ratio can be obtained. On the other hand, by using a dye-based polarizing plate for one provided at the optical element 2 side (light emission surface), it becomes possible to obtain high reliability even in a case where outside light enters or ambient temperature is high.

In a case where the liquid crystal panel is used as the video display apparatus 4, in particular, in a case where the driver wears polarized sunglasses in such a situation, a specific polarized wave is blocked or shielded, whereby a defect in which video cannot be viewed occurs. In order to prevent this situation, it is preferable that a λ/4 plate is arranged at a side of the optical element of the polarizing plate that is arranged at the optical element 2 side of the liquid crystal panel, whereby the video light uniformed to a specific polarization direction is converted into circular polarized light.

The controller 40 obtains, from such a navigation system 61, various kinds of information such as a speed limit and the number of lanes of a road corresponding to a current position at which the own vehicle is travelling, and a scheduled movement route of the own vehicle set to the navigation system 61 as foreground information (that is, information to be displayed at a front of the own vehicle by the virtual image described above).

A driving support ECU 62 is a controller that realizes driving support control by controlling a drive system and a control system in accordance with an obstacle detected as a result of monitoring by a circumference monitoring device 63. The driving support control includes well-known technologies such as cruise control, adaptive cruise control, pre-crush safety, lane keeping assist, for example.

The circumference monitoring device 63 is a device for monitoring a status of a circumference of the own vehicle. As one example, there are a camera that detects an object existing on the circumference of the own vehicle on the basis of an image obtained by photographing the circumference of the own vehicle, an exploratory device that detects an object existing around the own vehicle on the basis of a result obtained by transmitting and receiving an exploratory wave, and the like.

The controller 40 obtains such information from the driving support ECU 62 (for example, a distance to a preceding vehicle and a direction of the preceding vehicle, a position at which an obstacle or a traffic sign exists, and the like) as foreground information. Moreover, an ignition (IG) signal and own vehicle state information are inputted to the controller 40. The own vehicle state information among these kinds of information is information obtained as the vehicle information. For example, the own vehicle state information contains warning information indicating to become an abnormal state defined in advance, such as residual quantity of fuel for an internal-combustion engine or temperature of cooling water. Further, the own vehicle state information also contains an operational result of a direction indicator, travelling speed of the own vehicle, and shift position information. The controller 40 that has been mentioned above is activated when the ignition signal is inputted thereto. As the above, the whole system of the information display apparatus according to the present embodiment has been described.

First Embodiment of Virtual Image Optical System

Next, further details of a virtual image optical system according to the present embodiment and the video display apparatus will be described below.

As have already been mentioned above, FIG. 2 is a top view of the vehicle on which the information display apparatus 100 according to the present embodiment is mounted. A windshield exists as the projected member 6 in front of a driver's seat of a vehicle body 101. Note that an inclination angle of this windshield with respect to the vehicle body is different depending upon a type of the vehicle. Moreover, the inventors of the present application researched this radius of curvature in order to realize an optimum virtual image optical system. As a result, as shown in FIG. 3, the inventors found that in the windshield, the radius of curvature Rh in the horizontal direction parallel to a contact surface of the vehicle is different from the radius of curvature Rv in the vertical direction orthogonal with respect to a horizontal axis, and there is generally a relationship below between Rh and Rv.

Rh>Rv

Further, it was also found that most of vehicles has this difference between the radii of curvature, that is, the Rh with respect to Rv in a range from 1.5 times to 2.5 times.

Next, the inventors also researched commercial products with respect to the inclination angle of the windshield. As a result, although it is different depending upon a vehicle body type, it was 20° to 30° in a light motor vehicle or a minivan type, 30° to 40° in a sedan type, and 40° or more in a sports type. Thus, in the present embodiment, a difference between the radius of curvature Rh in the horizontal direction of the windshield parallel to the contact surface of the vehicle and the radius of curvature Rv in the vertical direction orthogonal to the horizontal axis and the inclination angle of the windshield were considered to design the virtual image optical system.

More specifically, since the horizontal radius of curvature Rh and the vertical radius of curvature Rv of the windshield that is the projected member are greatly different from each other, good aberration correction was realized by providing the optical element 2 in the virtual image optical system. The optical element 2 is axially asymmetric with the horizontal axis of the windshield with respect to the optical axis (Z axis) and the axis vertical to this axis.

Next, the inventors carried out examination for miniaturization of the information display apparatus 100. As a condition of the examination, horizontal: 7° and vertical: 2.6° of FOV were set, and a virtual image distance is further set to 2 m, whereby the examination was carried out. At first of the examination, the concave mirror 1 to generate a virtual image (which is simply displayed as a plane mirror in FIG. 5 below), the video display apparatus 4, and the backlight 5 were prepared as a basic configuration, and one optical path folding mirror was arranged between the video display apparatus 4 and the concave mirror 1. Simulation was carried out by using, as parameters, arrangement of the respective members and a distance from the video display apparatus 4 to the concave mirror 1 so that volume of the information display apparatus 100 becomes the minimum.

As a result, the volume when they were arranged so that video light from the video display apparatus 4 does not interfere with any of the members became 3.6 liters. Then, examination about a direct method in which the optical path folding mirror is removed was carried out for further miniaturization.

Figure 4:
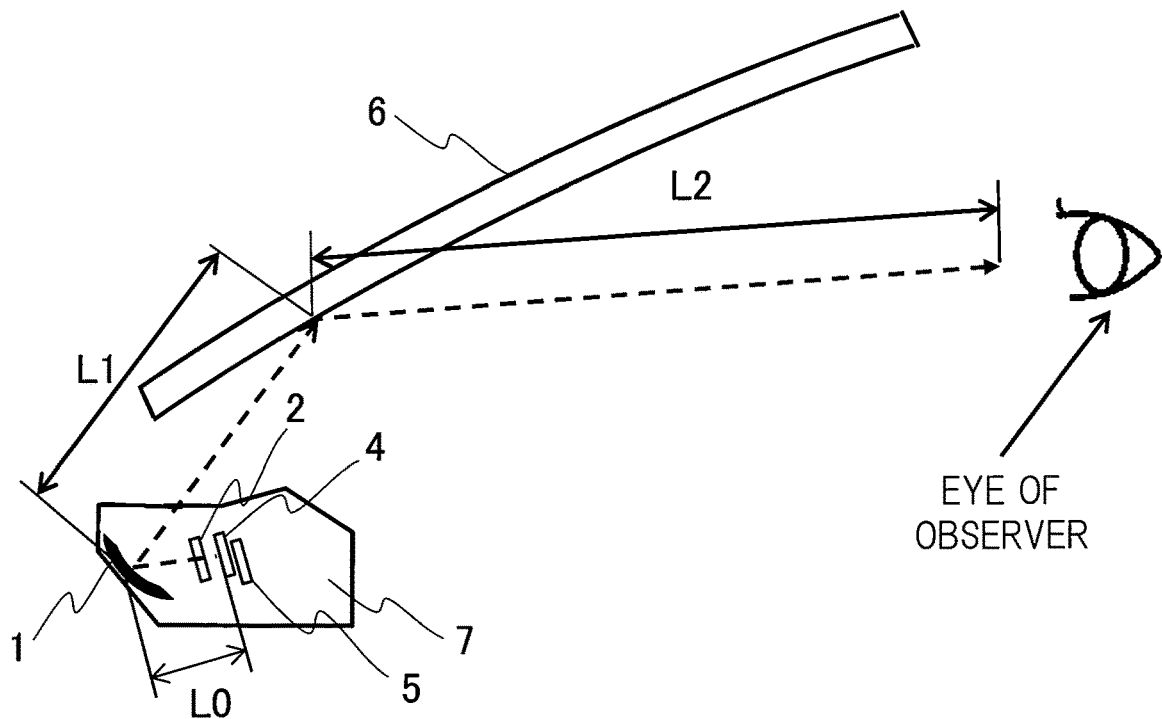
FIG. 4 is a schematic configuration diagram illustrating the information display apparatus, the windshield, and a viewpoint position of a driver.

A configuration of the virtual image optical system according to the present invention will be described with reference to FIG. 4. FIG. 4 is the configuration diagram illustrating a basic configuration to conduct a study for miniaturization in the virtual image optical system shown in FIG. 1 according to the present embodiment. In order to simplify description thereof, an optical element for correcting aberration and distortion aberration is omitted, and across-sectional shape in a vertical direction is shown as well as the windshield 6 shown in FIG. 1. The liquid crystal panel is assumed as the video display apparatus 4, and the video display apparatus 4 is arranged at a position at which the virtual image of displayed video is obtained by the concave mirror 1 as a basic configuration in which the backlight 5 is arranged.

Figure 5:
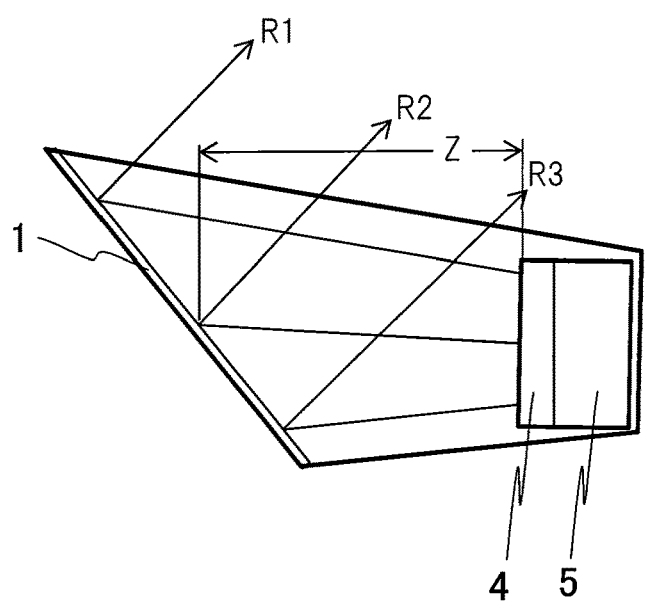
FIG. 5 is a schematic configuration diagram illustrating one embodiment of a virtual image optical system in the information display apparatus.

At this time, as shown in FIG. 5, each of video light R2 generated from video at a center, video light R1 generated from video at an upper end, and video light R3 generated at a lower end of the screen of the video display apparatus 4 is arranged so that the light is not interfered and blocked out by the video display apparatus 4 when they are reflected by the concave mirror 1, which becomes restriction in design.

The inventors set horizontal: 7° and vertical: 2.6° of the FOV at the same time in view of the design restriction described above, and further set a virtual image distance to 2 m, thereby determining volume of the information display apparatus 100 by using an interval Z between the concave mirror 1 and the video display apparatus 4 (the liquid crystal panel and the backlight 5) as a parameter. In a case where a distance Z is 100 mm, a vertical dimension of the concave mirror 1 can be made the smallest. In a case where the distance Z is set to 75 mm, an angle $\alpha_2$ between a horizontal plane and the concave mirror 1 becomes larger, and the vertical dimension of the concave mirror 1 also becomes larger. When the distance Z is further reduced to be equal to or less than 50 mm, an angle $\alpha_3$ between the horizontal plane and the concave mirror 1 further becomes larger, and the vertical dimension of the concave mirror 1 also further becomes larger.

As described above, a relationship between a set height and a set depth of the video display apparatus 4 was simulated by using the distance Z as a parameter. It is possible to reduce the set depth by making the distance Z smaller. However, the set height becomes higher. Similarly, in a relationship between the distance Z and set volume L, a change in the set volume (containing volume of an LCD driving circuit, a light source driving circuit, and a backlight unit) changed as a boundary when the distance Z is 60 mm compared with volume of a space from the video display apparatus 4 to the concave mirror (optical path volume and display).

From the above, in order to miniaturize the information display apparatus 100, it was found that it is necessary to realize the virtual image optical system in which the distance Z to directly enlarge video displayed by the video display apparatus 4 with the concave mirror is short, and that it is necessary for the center of a video display unit of the video display apparatus 4 in the vertical direction of the screen to be arranged at a lower side than the center of the concave mirror 1.

On the other hand, in this arrangement, a distance (corresponding to the ray R1) between the video display apparatus 4 and the upper end of the concave mirror 1 becomes long, while a distance (corresponding to the ray R3) between the video display apparatus 4 and the lower end of the concave mirror 1 becomes short. Thus, the video display apparatus 4 may be arranged so that the distance between the video display apparatus 4 and the concave mirror 1 becomes even as much as possible.

Figure 7:
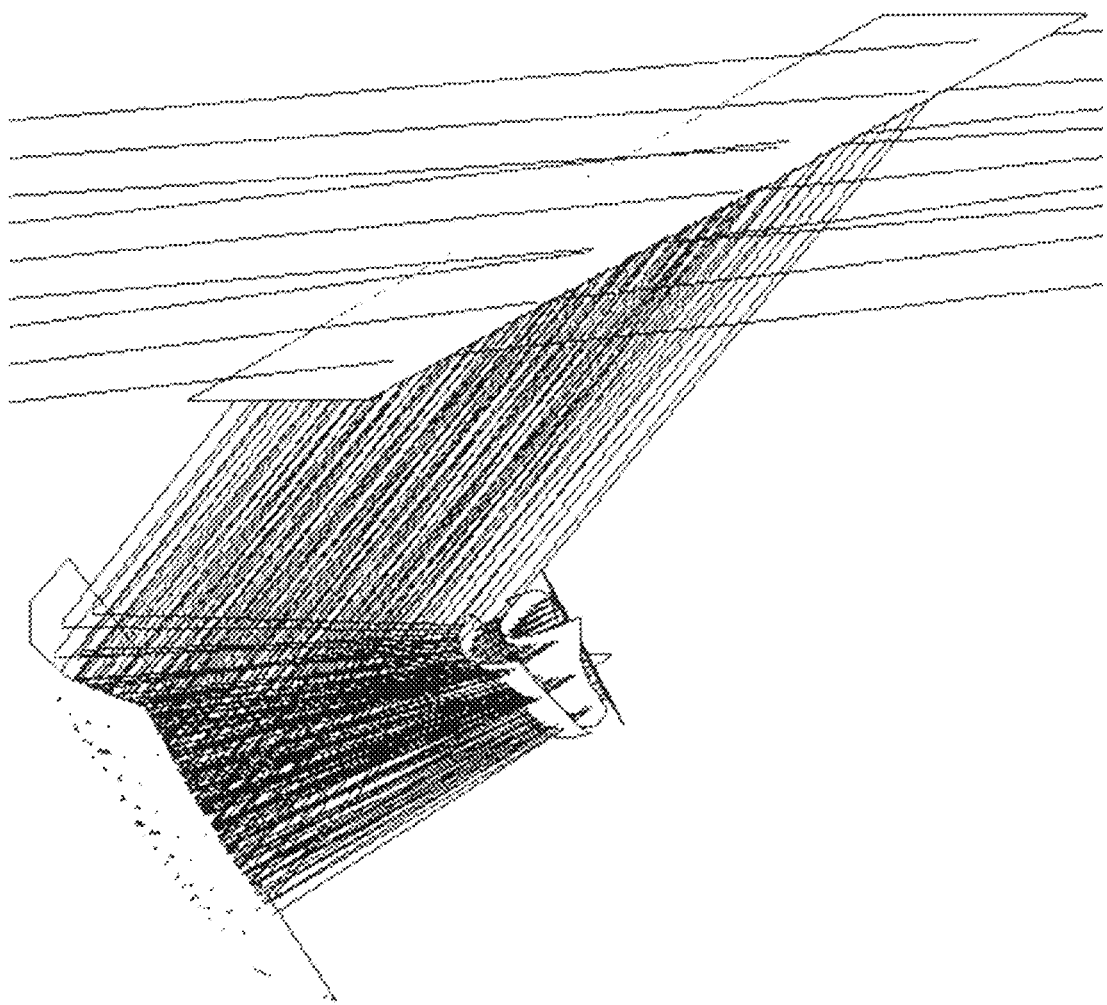
FIG. 7 is a ray diagram of a part of the virtual image optical system in the information display apparatus according to the embodiment.
Figure 8:
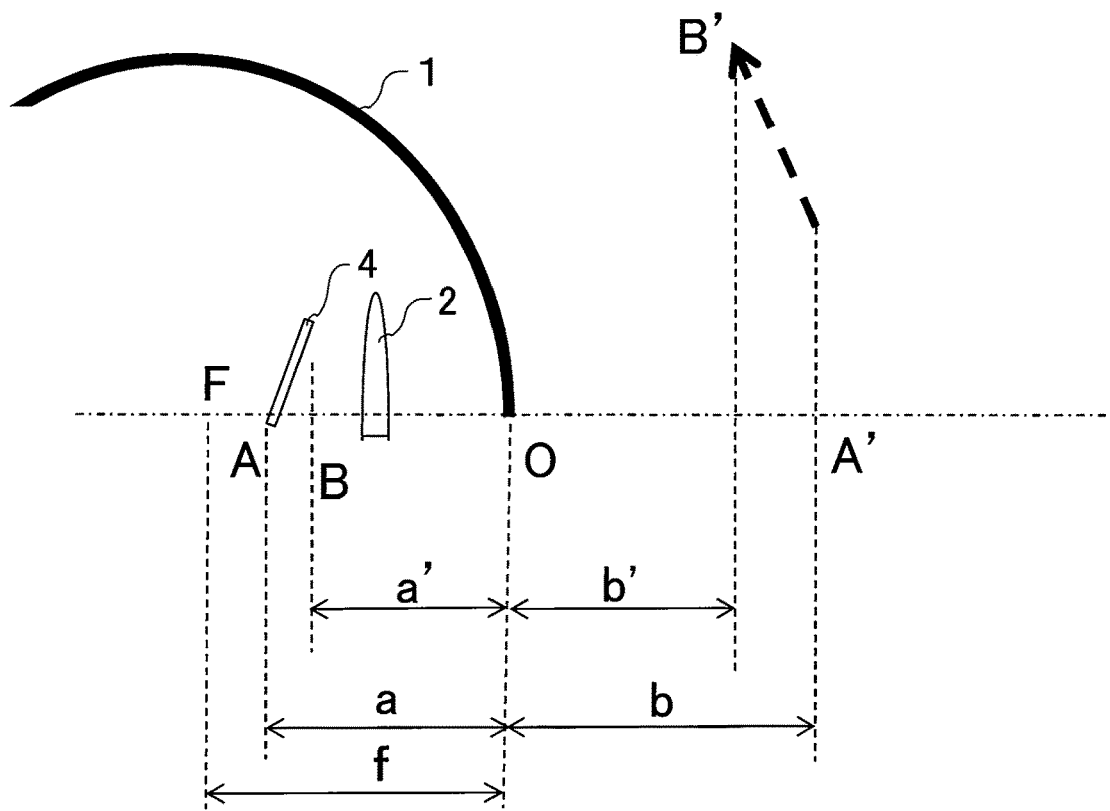
FIG. 8 is a schematic explanatory diagram for explaining a principle of the virtual image optical system.

In the virtual image optical system according to the present embodiment (see FIG. 6 and FIG. 7), distortion correction of the virtual image between the video display apparatus 4 and the concave mirror 1 and aberration correction by the optical element that corrects aberration occurring by the virtual image are carried out. This will be described later with reference to FIG. 8. Namely, by arranging the video display apparatus 4 (object point) inside a focal point F (focal point distance f) with respect to a point 0 on the optical axis of the concave mirror 1, it is possible to obtain the virtual image by the concave mirror 1. In FIG. 8, for convenience of explanation, the concave mirror 1 is regarded as a convex lens with the same positive refractive power, and a relationship among the object point, the convex lens (described by the concave mirror in FIG. 8 for convenience of explanation), and the virtual image to be generated is shown.

In the present embodiment, the optical element 2 is arranged in order to reduce distortion and aberration that occur on the concave mirror 1. This optical element may be configured by a transmissive optical lens or a concave mirror. However, a direction of the light flux incident on the concave mirror (an angle and a position thereof) is controlled so that:

(1) in a case where the video light from the video display apparatus 4 is made incident on the reflecting surface as a telecentric light flux, refractive power of the lens or the concave mirror 1 substantially becomes zero;

(2) in a case where the video light from the video display apparatus 4 is diverged and made incident on the optical element, the optical element has positive refractive power; and (3) in a case where the video light from the video display apparatus 4 is focused and made incident on the optical element, the optical element has negative refractive power. Hereby, the distortion aberration of the generated virtual image is corrected. Moreover, in case of the transmissive optical lens, aberration regarding image forming performance, which occurring in the virtual image, is corrected by interaction between an incident surface at the video display apparatus 4 side and an emission surface at the concave mirror 1 side. The case of one optical element has been described in the present embodiment. However, this may be configured by a plurality of transmissive optical lenses. Alternatively, this maybe configured by a combination of a reflective optical lens (or mirror) and a transmissive optical lens.

At this time, as described above, in a size of the virtual image viewed and recognized by the driver, each of a distance a between the video display apparatus 4 and the concave mirror 1 and a distance b between the concave mirror 1 and the virtual image, which are generated due to inclination of the windshield, is different between the upper end and the lower end of the virtual image. For that reason, a double image of a virtual image is generated in a case where the windshield or combiner is used as the reflecting surface. Thus, in the present embodiment, a technique to reduce double image conversion of the virtual image that occurs in such a case by contrivance of an optical system has been developed. Its details will be described below.

Mechanism of Occurrence of Double Image Conversion of Virtual Image

As a result of various kinds of investigation, the inventors developed a technique to reduce double image conversion of a virtual image, which will be described below in detail, on the basis of knowledge mentioned below.

Figure 9:
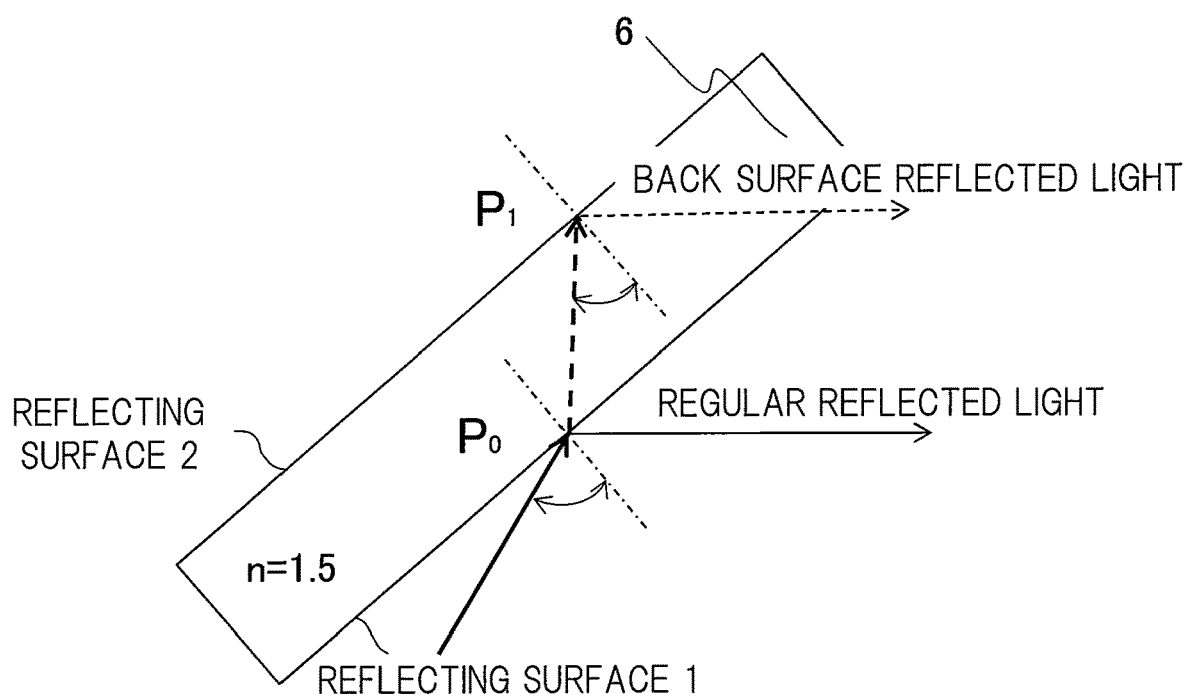
FIG. 9 is a schematic view for explaining a principle of generation of a double image.

As illustrated in FIG. 9, with respect to a virtual image that is reflected and then viewed and recognized by the driver at an upper portion of windshield 6, a ray that generates the virtual image described above is obliquely made incident on the windshield 6 due to inclination of the windshield 6. Thus, when a thickness of the windshield 6 is set to t, a reflection position a of regular light reflected by a reflecting surface near the driver (hereinafter, referred to as a "reflecting surface 1 (or first reflecting surface)") and a reflection position b of back surface reflected light reflected by a reflecting surface far from the driver (hereinafter, referred to as a "reflecting surface 2 (or second reflecting surface)") are shifted upward to each other by a distance L in the vertical direction, whereby two virtual images are formed.

A reflection factor of light incident on the windshield from the air is 4%, and a reflection factor by an interface between the windshield and the air is 4%. They are the same. In a regular virtual image by the regular light and a second virtual image by the back surface reflected light, brightness by the regular virtual image is nearly equal to brightness by the second virtual image by the back surface reflected light. For this reason, reduction of brightness of the virtual image by the back surface reflected light becomes absolutely necessary in order to obtain good resolution performance of video by the virtual image.

On the other hand, as well as the reflection at the upper portion as illustrated in FIG. 9, in the virtual image reflected at the lower portion of the windshield 6 and then viewed and recognized by the driver, the ray that generates the virtual image described above is obliquely made incident on the windshield 6 due to inclination of windshield 6. The back surface reflected light of the other is shifted upward with respect to regular reflected light, whereby two virtual images are formed.

Moreover, in the horizontal direction of the screen, the back surface reflected light is shifted in a direction away from a point at which the optical axis of the concave mirror crosses the windshield with respect to the regular reflected light, whereby two virtual images are formed.

Figure 34:
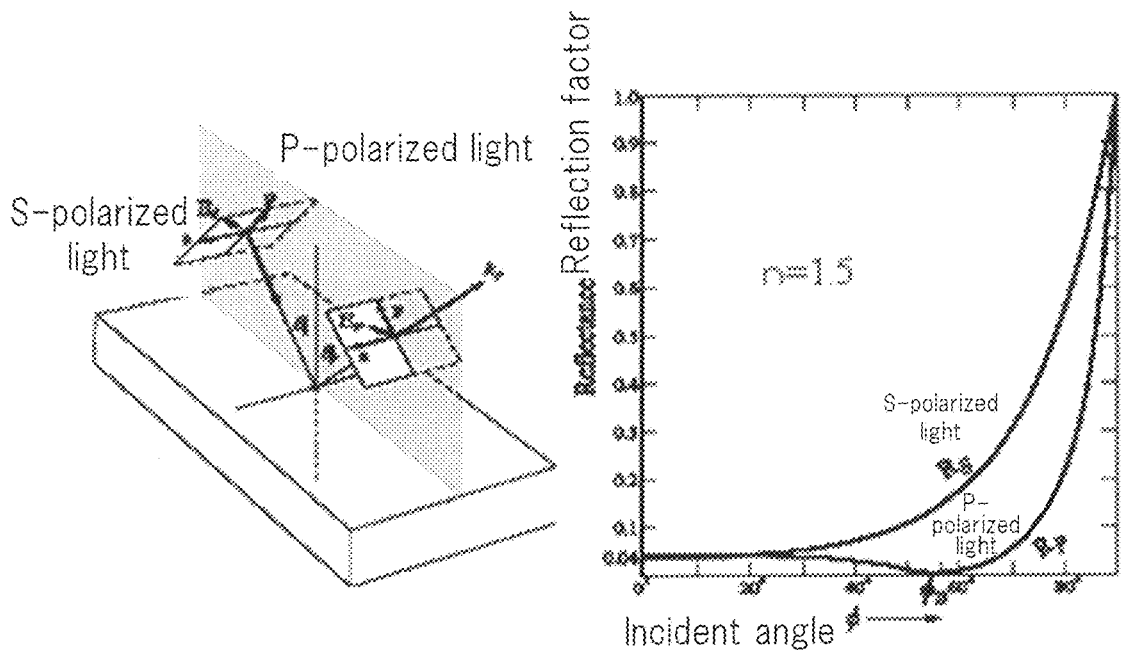
FIG. 34 is a schematic view for explaining a change in a reflection factor of glass based on an incident angle by S-polarized light and P-polarized light.

In a case where a refractive index of the windshield is set to 1.5 as descried above, a relationship between an incident angle of a video light ray to the windshield and a reflection factor is illustrated in FIG. 34. In case of vertical incidence, both reflection factors with respect to S-polarized light and P-polarized light are about 4%. However, when the incident angle exceeds 25°, the reflection factor with respect to the S-polarized wave becomes larger.

For this reason, in a case where an LCD is used as the video display apparatus, the reflection factor of the windshield varies depending upon which polarized light is used as video output light. Thus, there is a possibility that brightness of the virtual image, which the driver can view and recognize, may vary depending upon the incident angle to the reflecting surface.

Moreover, when a distance between the windshield and the concave mirror is not changed and a region that the driver can view and recognize the virtual image is enlarged, an angle of the video light ray incident on the windshield becomes larger, and double images are generated in the vertical direction and the horizontal direction of the screen. This interferes with a focus feeling of the virtual image.

For this reason, the inventors found that it is further better to reduce distortion aberration occurring due to this by inclining the video display apparatus 4 with respect to the optical axis of the concave mirror 1 as shown in FIG. 9 to substantially match image magnification M'=b'/a' of an upper end portion of the virtual image with image magnification M=b/a of a lower end portion of the virtual image.

Moreover, by setting an average radius of curvature of a cross-sectional shape of the optical element 2 in a vertical direction and an average radius of curvature of a cross-sectional shape in a horizontal direction to different values, distortion aberration occurring by an optical path difference that occurs due to a difference between the radius of curvature Rv in the vertical direction and the radius of curvature Rh in the horizontal direction of the windshield described above and aberration that deteriorates the image forming performance of the virtual image are corrected.

As mentioned above, in the information display apparatus 100 that obtains a virtual image by directly reflecting video light to the windshield 6, correction of aberration occurring by the optical path difference that occurs due to the difference between the radius of curvature Rv in the vertical direction and the radius of curvature Rh in the horizontal direction of the windshield 6 becomes the most important for securement of the image forming performance of the virtual image.

For this reason, the inventors reduced deterioration of the image forming performance of the virtual image due to the difference between the radii of curvature of the windshield described above by using a free-form surface shape (see Formula 1 below) capable of defining a shape of a surface as a function of an absolute coordinate (x, y) from the optical axis against an aspherical shape (see Formula 2 below), which has been used in a conventional optical design, to define a shape of a lens surface or mirror surface as a function of the distance r from the optical axis.

$$Z = \frac{c \cdot (x^2 + y^2)}{1 + \sqrt{1 - (1+K)c^2 \cdot (x^2 + y^2)}} + \sum\sum (Cj(m,n) \times x^m \times y^n) \quad \text{[Formula 1]}$$

$$j = [(m+n)^2 + m + 3n]/2 + 1$$

Note that the aspherical shape to define the shape of the lens surface or mirror surface is expressed as a function of the distance r from the optical axis like Formula 2 below.

$$Z = \frac{c \cdot h^2}{1 + \sqrt{1 - (1+K)c^2 \cdot h^2}} + A \times h^4 + B \times h^6 + C \times h^8 + \quad \text{[Formula 2]}$$
$$D \times h^{10} + E \times h^{12} + F \times h^{14} + G \times h^{16} + H \times h^{18} + J \times h^{20}$$

A refractive index of a windshield for a vehicle is generally 1.5 (n=1.5), and a reflection factor per one surface thereof is 5%. As described above, the information display apparatus 100 causes a virtual image to be reflected by the windshield to form video in the EyeBox of the driver. For this reason, as illustrated in FIG. 9, a video light ray is separated into regular reflected light reflected by the reflecting surface 1 positioned at an internal side of the vehicle of windshield 6 and back surface reflected light reflected by the reflecting surface 2 that is in contact with the outside air. It is recognized as a double image by eyes of the driver. A direction in which this double image is generated is different between the vertical direction and the horizontal direction of the windshield 6. In a case where the information display apparatus 100 is arranged under the windshield 6, a double image that is generated by the back surface reflected light is generated at an upper portion of video by the regular reflected light.

Similarly, even in a case where the information display apparatus 100 is arranged above the windshield, a double image generated by the back surface reflected light is generated at the upper portion of the video by the regular reflected light.

On the other hand, a double image in the horizontal direction of the windshield is generated at the outside in its peripheral portion (in a direction away from the driver). This is because the radius of curvature at the peripheral portion becomes smaller than that at the center of the windshield. In order to reduce this, (1) The back surface reflected light is reduced by providing antireflection coating on a surface of the windshield that is in contact with the outside air.

(2) Moreover, the inventors thought that a visual double image is reduced in a projection optical system that generates a virtual image by applying measures (will be described below) thereto.

Next, an embodiment in which the double image described above is to be reduced will be described in detail with reference to FIG. 10. Note that in order to simplify explanation thereof, it will be described herein by using a real image projection optical system.

Figure 10:
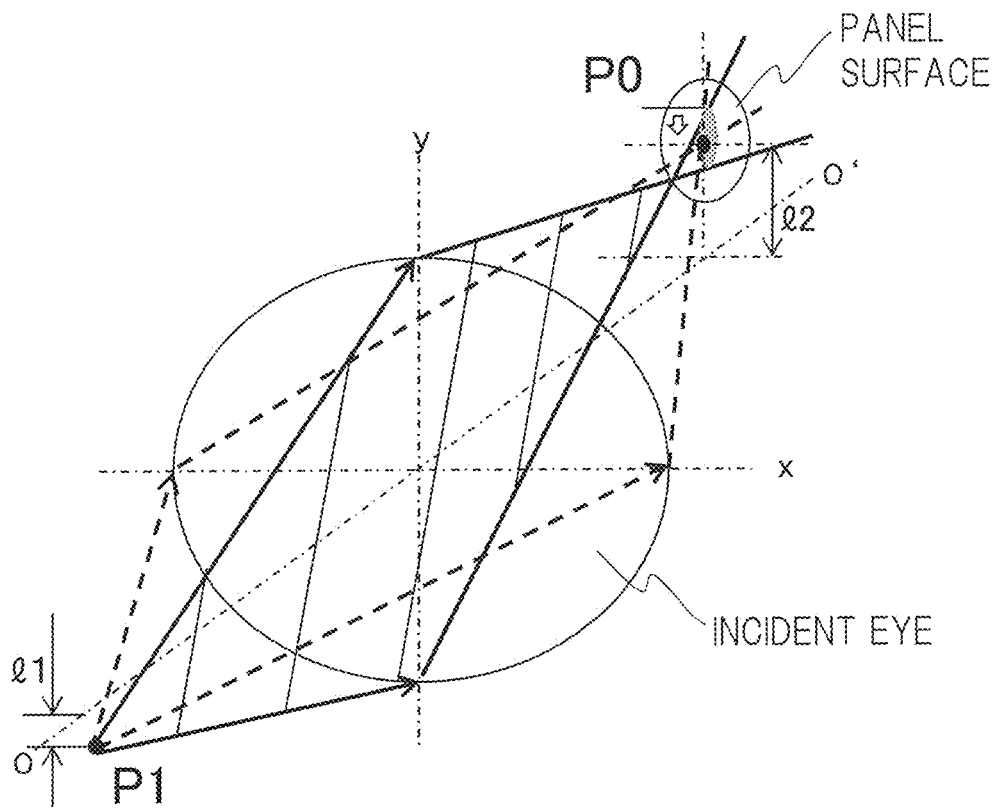
FIG. 10 is a schematic explanatory diagram for explaining a principle of the present invention.

FIG. 10 illustrates a relationship between an object point P1 and an image formation point P0 of the real image projection optical system. As evaluation of the image forming performance, the image forming performance on a panel surface is evaluated by evenly dividing an incident eye from a side of the virtual image (an original image formation point) toward the panel surface (an original object point) that is an object point and causing a ray to fly.

Figure 11:
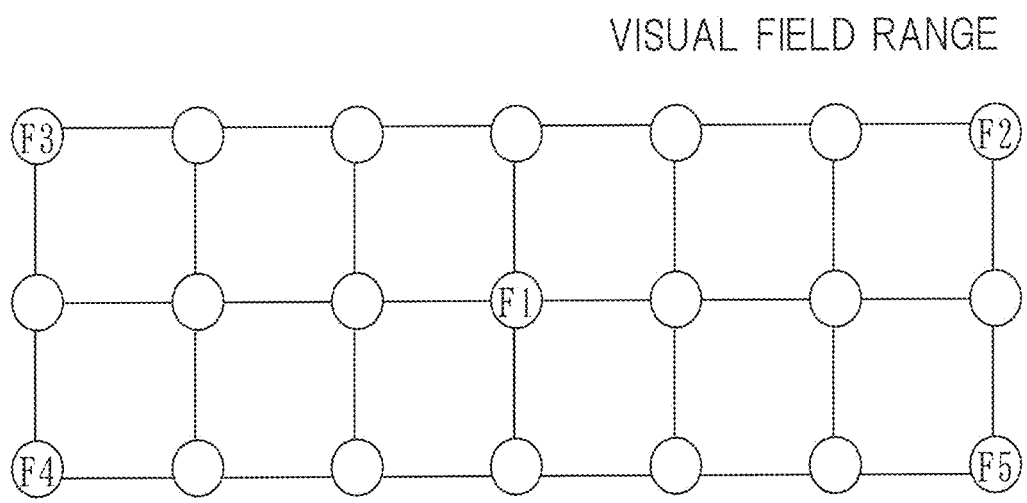
FIG. 11 is a view illustrating resolution performance evaluation points in EyeBox according to the embodiment.

The EyeBox of the driver is divided as illustrated in FIG. 11, and ray tracking is carried out at equal intervals. Thus, the image forming performance on the panel surface corresponding to each evaluation point was evaluated. In results based on lens data indicated in FIG. 14 and FIG. 15 according to the present embodiment, a size of aberration occurring at the center of the screen is different from that occurring at the peripheral portion as illustrated in FIG. 12 and FIG. 13. For this reason, a spot shape varies depending upon a position in the screen, and spots does not become concentric with respect to a main ray that passes through the center of the incident eye (a point crossing the optical axis), whereby blurring (or aberration) occurs.

Thus, with respect to design of the lens, in order to reduce aberration that occurs outside the main ray, it may be designed so that a ray passing through an upper peripheral portion of a pupil travel toward the inside of the main ray. Specifically, an optical element having a shape, by which refractive power by an optical path through which a ray passing through an upper peripheral portion than a ray position, through which the main ray passes, passes becomes relatively stronger compared with refractive power by an optical path through which the main ray passes, may be arranged.

This will be described on the basis of a case of reverse tracking in which a ray is caused to fly from an image point toward an object point as illustrated in FIG. 10. In this method, an object point is arranged at a side of a virtual image; an image point is used as a panel surface; an incident eye of a virtual image optical system is evenly divided; and a ray is caused to fly, whereby image forming performance on a panel surface is evaluated. In the virtual image optical system, relative refractive power of the virtual image optical system of a meridional ray indicated by a solid line is also different from that of a sagittal ray indicated by a broken line.

For this reason, in a case where focus performance is set to best by the sagittal ray, the meridional ray focuses on in front of the panel surface, and aberration occurs on the panel surface (which is displayed by gray (a meshed portion) in FIG. 10). For this reason, in a case where the information display apparatus 100 is arranged under the windshield, the double image generated by the back surface reflected light among the double images that may be generated on the windshield described above is generated at the upper portion of the video by the regular reflected light. Therefore, in order to reduce this, relative refractive power of a virtual image optical system through which a ray passing through an upper portion than the center of an incident eye passes may be set to be smaller than relative refractive power of a virtual image optical system through which a ray passing through the center and a lower portion than the center of the other incident eye passes so that aberration occurs below the main ray.

On the other hand, the double image in the horizontal direction of the windshield is generated at the outside in its peripheral portion (in a direction away from the driver). This is because the radius of curvature at the peripheral portion becomes smaller than that at the center of the windshield. For that reason, the double image generated by the back surface reflected light is generated outside the video by the regular reflected light. Thus, in order to reduce this, relative refractive power of a virtual image optical system through which a ray passing through the outside of the center of an incident eye passes maybe set to be smaller than relative refractive power of a virtual image optical system through which a ray passing through the center and an inner portion than the center of the other incident eye passes so that aberration occurs inside the main ray.

Figure 35:
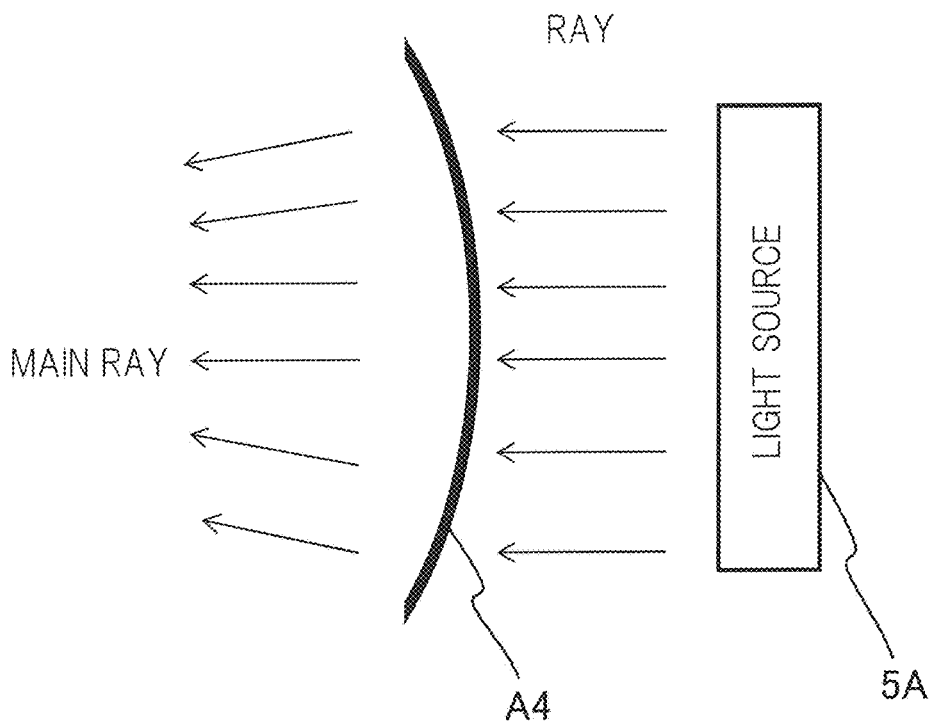
FIG. 35 is a schematic configuration diagram for explaining a concrete method of reducing Petzval sum of the virtual image optical system.

Further, in place of the design of the lens described above, as illustrated in FIG. 35, by curving a panel surface 4A, which is the video display apparatus 4 constituting the real image projection optical system, so as to fit with a curved surface of the windshield, the similar effects described above can be obtained. More specifically, a radius of curvature in the vertical direction of the windshield is smaller than a radius of curvature in the horizontal direction. Thus, in a case where the windshield is replaced by a concave mirror, optical power in the vertical direction is large. For this reason, by making the radius of curvature in the vertical direction of the panel smaller than that in the horizontal direction and making the optical Petzval sum smaller in the whole system, the curvature of field is reduced. This can be realized by configuring the panel surface 4A to be curved in a convex manner with respect to a light source 5A. Note that the windshield has different radii of curvature between the vertical direction and the horizontal direction as described above. Therefore, it is preferable that curvature of the panel surface 4A is also set appropriately in accordance with the different radii of curvature of the windshield.

Figure 36:
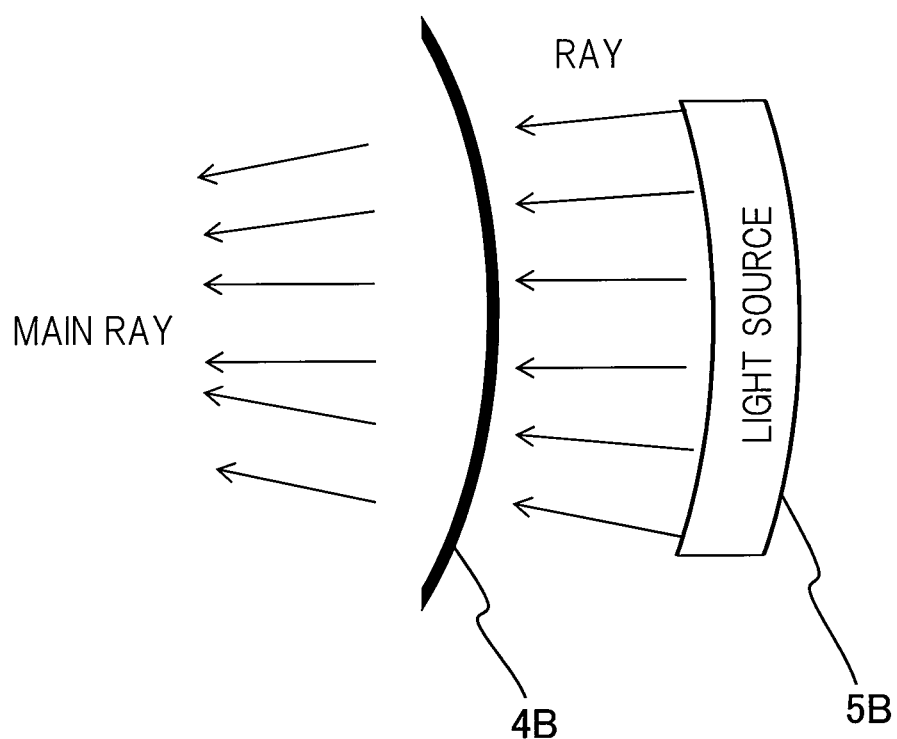
FIG. 36 is a schematic configuration diagram for explaining a concrete method of reducing Petzval sum of the virtual image optical system.

In order to take light in the virtual image optical system described above more effectively, as illustrated in FIG. 36, a radius of curvature of a panel surface 4B may be matched up with a radius of curvature of a light source 5B.

Figure 16:
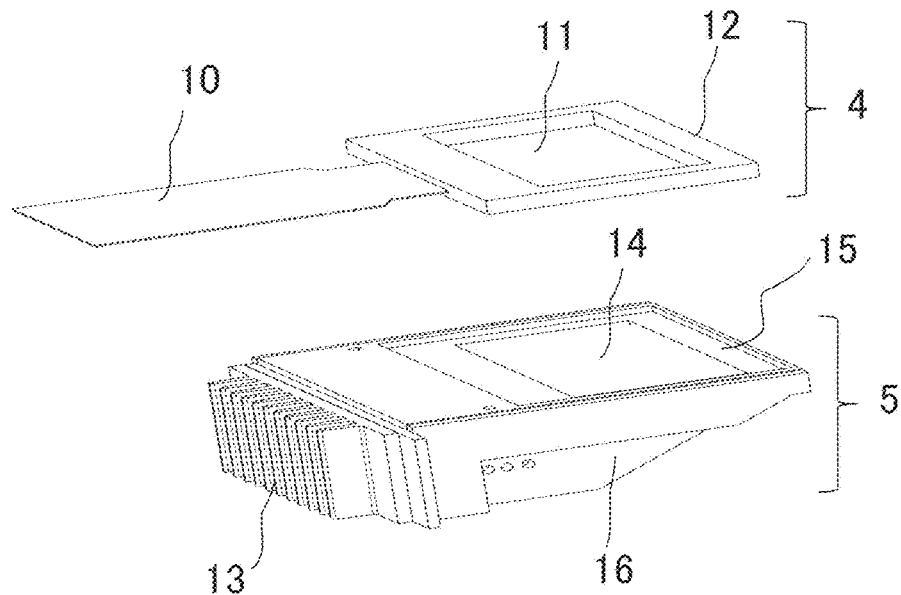
FIG. 16 is a configuration diagram illustrating arrangement of the video display apparatus and a light source apparatus.

Next, a configuration according to the embodiment of the present invention for allowing the double image described above to be reduced and allowing a virtual image with high visibility to be formed will be described in detail with reference to FIG. 16 to FIG. 32. FIG. 16 is an enlarged view of a main portion of the liquid crystal panel and a backlight light source 5 as the video display apparatus 4 in the virtual image optical system according to the embodiment described above. By modulating light from the backlight by a video signal inputted from a flexible board 10 of the liquid crystal panel, video is displayed on a liquid crystal panel display surface 11, and a virtual image is generated from the displayed video by the virtual image optical system (including a free-form surface concave mirror and a free-form surface optical element in the embodiment) to inform the driver of video information.

In the configuration described above, an LED light source with relatively inexpensive and high reliability as a solid light source is used for a light source element of the backlight light source 5. A surface emission type of LED is used for high output. Therefore, light utilization efficiency is improved by using technical ingenuity (will be described later). Emission efficiency of the LED with respect to input electric power is different depending upon emission color, and is about 20% to 30%. The remaining is almost converted into heat. For this reason, as a frame to attach the LED, by providing a fin 13 for heat radiation configured by a member with high thermal conductivity (for example, a metallic member such as aluminum) to radiate heat to the outside, an effect to improve the emission efficiency of the LED itself can be obtained.

In particular, emission efficiency of an LED using red as emission color, which currently goes on the market, is significantly deteriorated when junction temperature becomes higher, and chromaticity of video changes at the same time. Thus, it is preferable that the light source element is configured so that priority to reduce temperature of the LED is raised and an area of the corresponding radiation fin becomes larger to improve cooling efficiency. In order to guide light diffused from the LED to the liquid crystal panel 4 efficiently, a light guide element 18 is used in the example shown in FIG. 17. However, it is preferable that the whole is covered by an exterior member 16 to unify the backlight light source so that dust or the like does not adhere thereto, for example.

Figure 17:
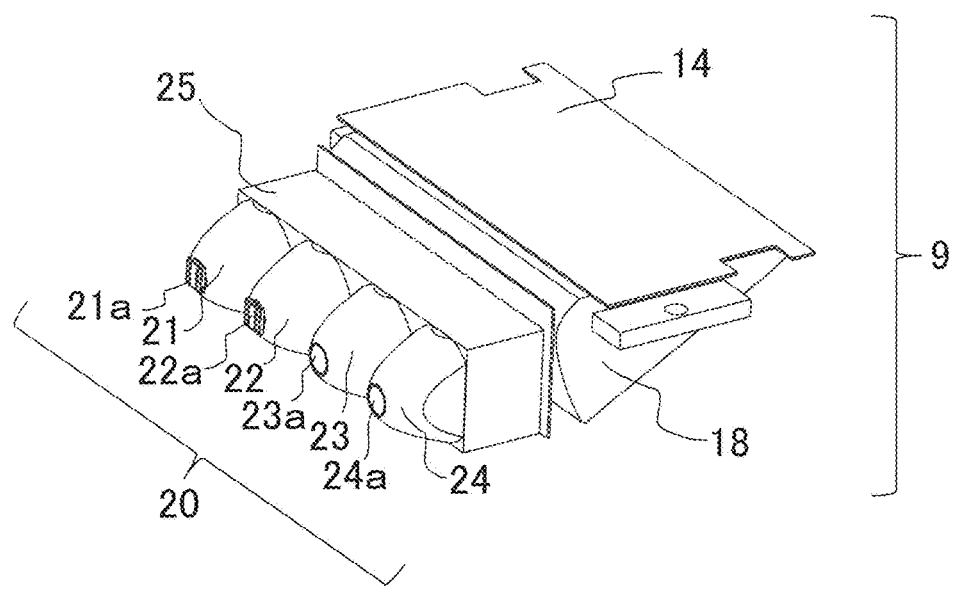
FIG. 17 is a schematic configuration diagram illustrating a configuration of the light source apparatus.

Further, FIG. 17 shows an enlarged view of a main part of a light source unit including an LED that is a light source, a light guide element and a diffused plate. As is apparent from FIG. 17, by inserting a medium between the LEDs to optically connect openings 21a, 22a, 23a, 24a that take in divergent light rays from LEDs of light funnels 21, 22, 23, and 24 to each other as a plane or by having a focusing action as a convex shape to cause the light source light to be diverged to become parallel light as much as possible, an incident angle of light made incident on a boundary surface of the light funnel is made smaller. As a result, the divergent angle can further be made smaller after passing through the light funnel.

Therefore, control of the light source light directed to the liquid crystal panel after being reflected by the light guide element 18 can be facilitated.

Moreover, in order to improve utilization efficiency of divergent light from the LED, polarization conversion is carried out for a joining portion 25 between the light funnels 21 to 24 and the light guide element 18 by using a PBS (Polarizing Beam Splitter) to convert that of the light to a desired polarization direction, whereby it is possible to improve efficiency of incident light to the LCD.

As described above, in a case where the polarization direction of light source light is uniformed, it is further preferable that material with low birefringence is used as raw material of the light guide element 18 so that problems such as coloring at the time of black display does not occur, for example, when a direction of the polarized wave is rotated and the polarized wave passes through the liquid crystal panel.

As mentioned above, the light flux from the LED whose divergent angle is reduced is controlled by the light guide element; is reflected by a totally reflecting surface that is provided an inclined surface of the light guide element 18; is diffused by a diffusing member 14 arranged between an opposing surface and the liquid crystal panel; and is then made incident on the liquid crystal panel 4 as the video display apparatus. In the present embodiment, as described above, the diffusing member 14 is arranged between the light guide element and the liquid crystal panel 4. However, the similar effect can be obtained even though a diffusing effect is caused to have an end surface of the light guide element 18 to provide a fine uneven shape, for example.

Figure 20:
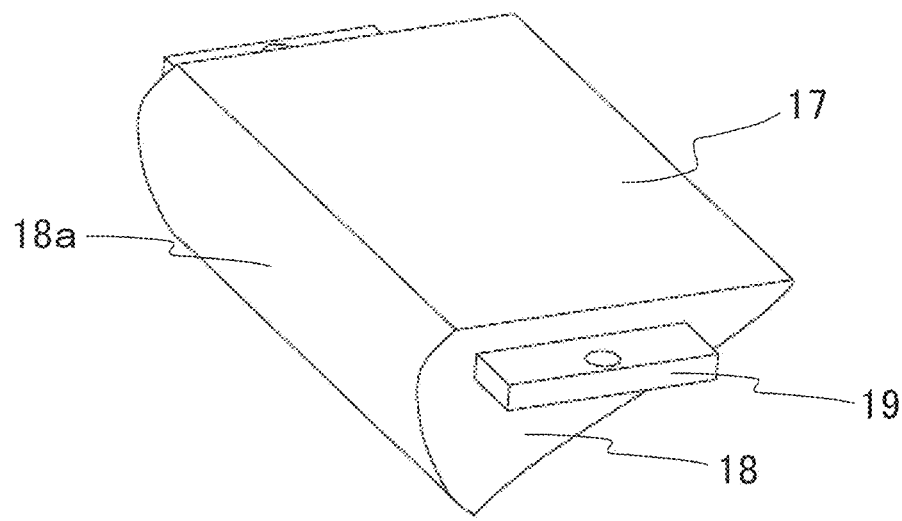
FIG. 20 is a schematic configuration diagram illustrating a shape of a light guide element in the light source apparatus.

Next, a configuration of the light guide element 18 described above and effects obtained by the same will be described with reference to FIG. 20. FIG. 20 is an outline view illustrating the light guide element 18 according to the present embodiment. The light flux whose divergent angle is reduced by the light funnels 21 to 24 shown in FIG. 11 is made incident on a light incident surface 18a of the light guide element 18. At this time, the divergent angle of the vertical direction (vertical direction in FIG. 21) is controlled by a shape (FIG. 21 shows a cross-sectional shape thereof) effect of the incident surface, and the light flux efficiently transmits within the light guide element 18.

Figure 21:
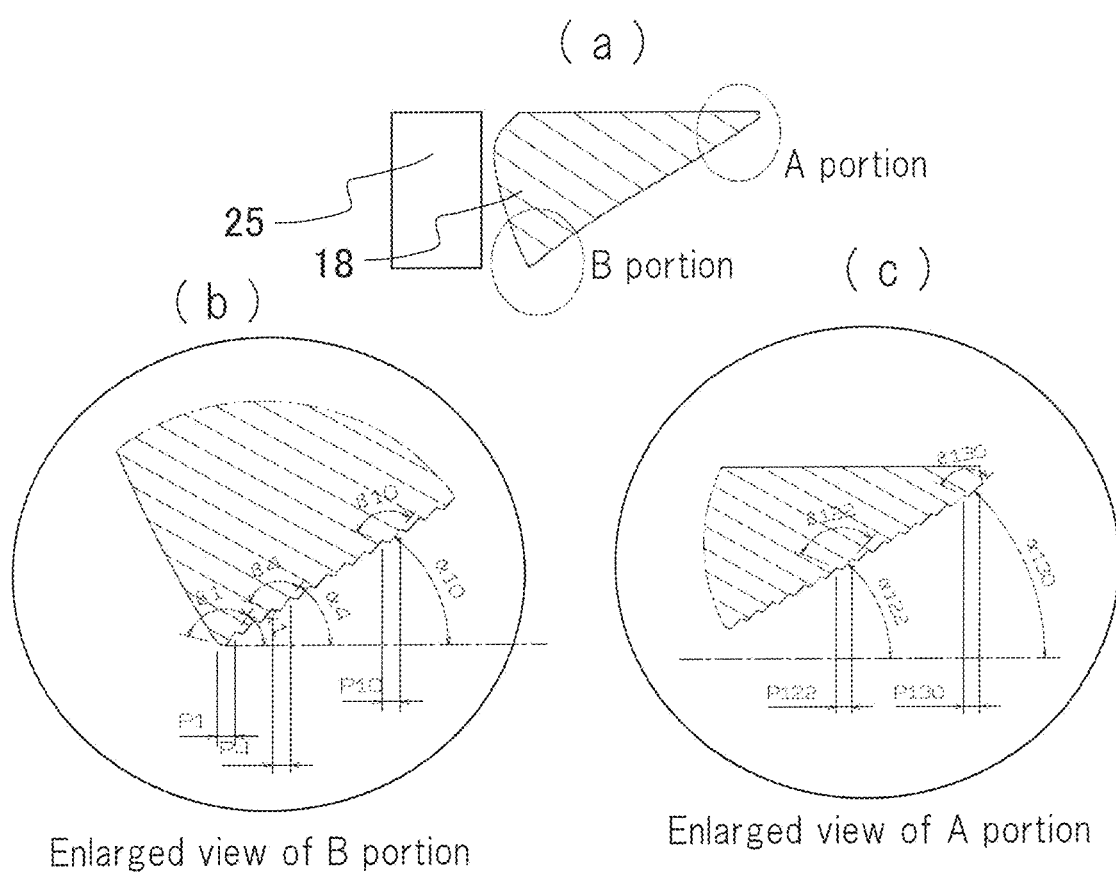
FIG. 21 is a schematic configuration diagram illustrating a cross-sectional shape of the light guide element in the light source apparatus.

FIG. 21 is an enlarged cross-sectional view of a main portion of the light guide element. The light source light whose divergent angle is reduced by the light funnels 21 to 24 is made incident from the incident surface 18a via the joining portion 25 as described above, and is totally reflected by a prism 18 as the light guide element 18, which is provided on the opposing surface, toward an opposing surface 17. A shape of the totally reflecting prism 18 is divided and formed in a stepwise shape in the vicinity (enlarged view of B portion) of and at an end portion (enlarged view of A portion) of the incident surface 18a in accordance with the divergent angle of the light flux made incident on each surface, whereby an angle of the totally reflecting surface is controlled. On the other hand, an arrival position and an amount of energy of the divided light flux after reflection are controlled by using a division dimension of the totally reflecting surface described above as variables so that light quantity distribution of the light flux made incident on the liquid crystal panel 4 that is the video display apparatus becomes uniform in the emission surface of the liquid crystal panel 4.

Figure 18:
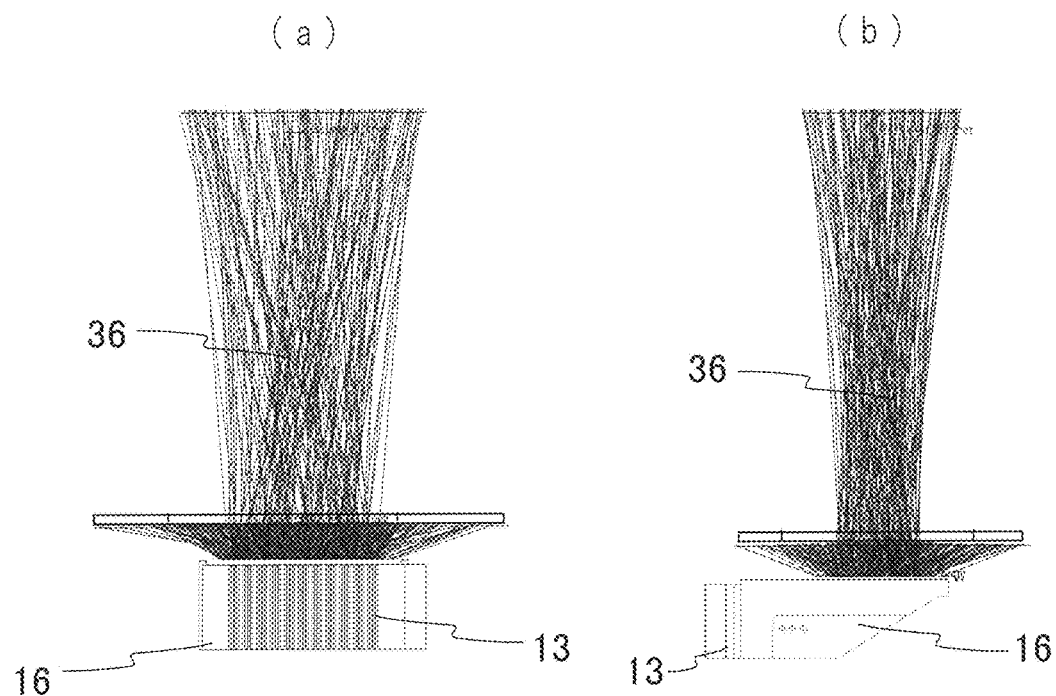
FIG. 18 is a schematic view for explaining an emission status of a light flux from the video display apparatus and the light source apparatus.

FIG. 18 shows a result obtained by simulating a state where emission light from the backlight described above passes through the liquid crystal panel in the information display apparatus 100 according to the present embodiment. FIG. 18(a) is a view illustrating an emission state of light when viewed from a longitudinal direction of the liquid crystal panel. FIG. 18(b) is a view illustrating an emission state of light when viewed from a short side direction (that is, a direction perpendicular to the longitudinal direction thereof) of the liquid crystal panel. In the present embodiment, the horizontal angle of the FOV is widened more than its design. Therefore, it is designed that brightness of the virtual image viewed and recognized by right and left eyes is not changed extremely even in a case where a diffusion angle in a horizontal direction is enlarged with respect to that in a vertical direction and a position of eyes is moved by rotation of the driver's head.

Figure 19:
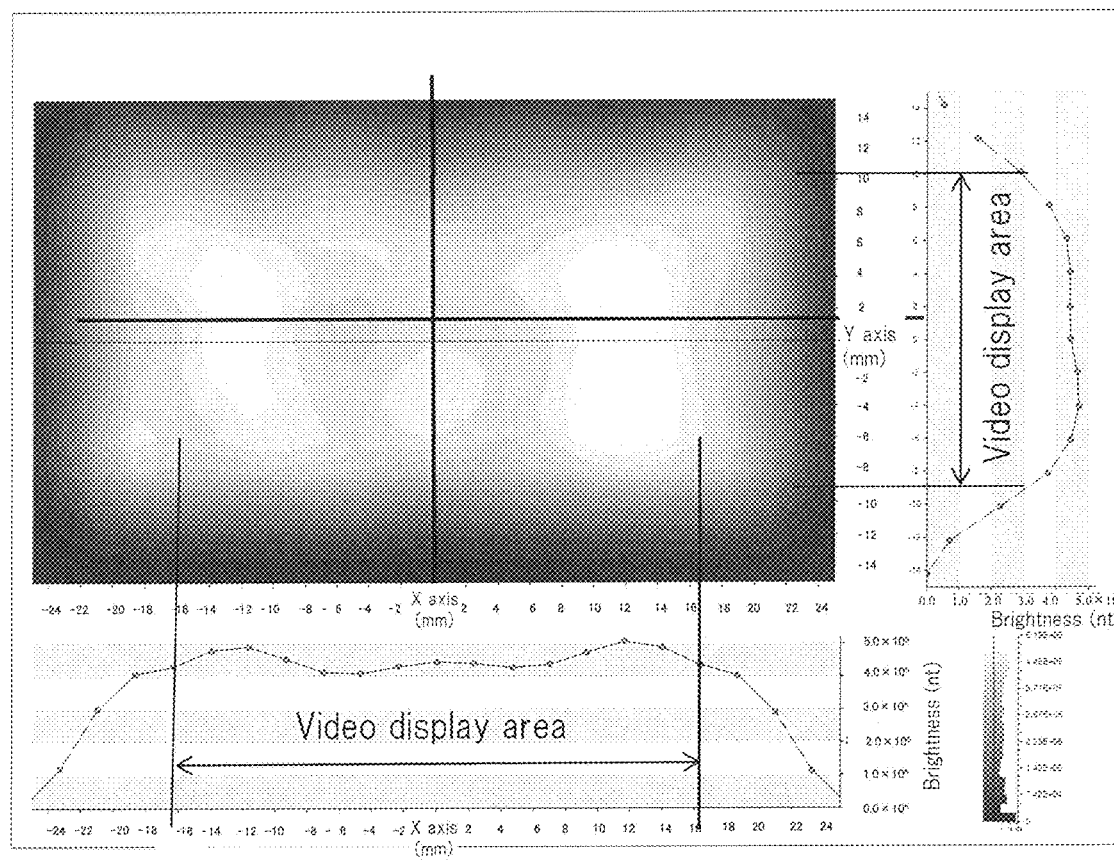
FIG. 19 is a characteristic diagram for explaining emission light distribution of the light flux from the light source apparatus.

Further, by making a divergent angle of the backlight in the vertical direction smaller, a divergent angle of video displayed on the liquid crystal panel in a vertical direction of the screen is made smaller, whereby generation of a double image is suppressed. FIG. 19 illustrates brightness distribution of the emission surface of the liquid crystal panel 4 in case of using the backlight by controlling an emission direction and intensity of light by using the light guide element 18 like the present embodiment. As is apparent from FIG. 19, inclination of deterioration of brightness outside an effective range of the vertical direction (long side direction) of the screen can be made smaller in addition to the brightness distribution of the vertical direction (short side direction) of the screen.

Figure 22:
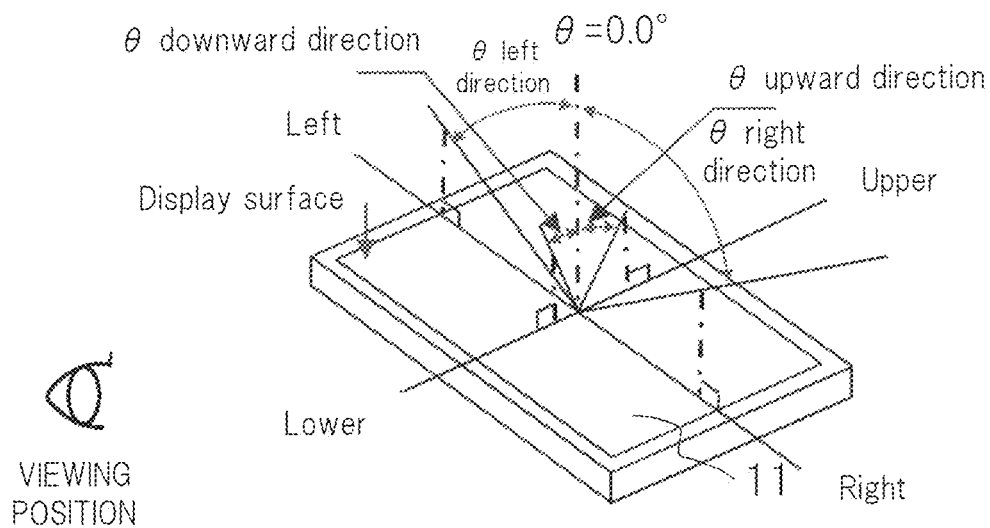
FIG. 22 is a conceptual diagram illustrating a method of characteristic evaluation for a liquid crystal panel.
Figure 23:
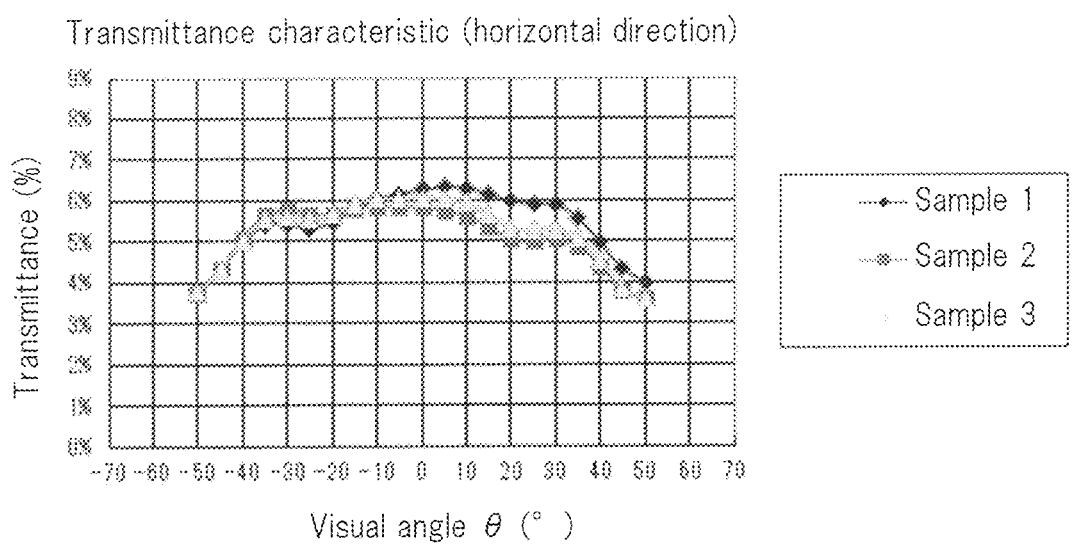
FIG. 23 is a characteristic diagram illustrating a transmittance characteristic of a screen in a horizontal direction of the liquid crystal panel.
Figure 24:
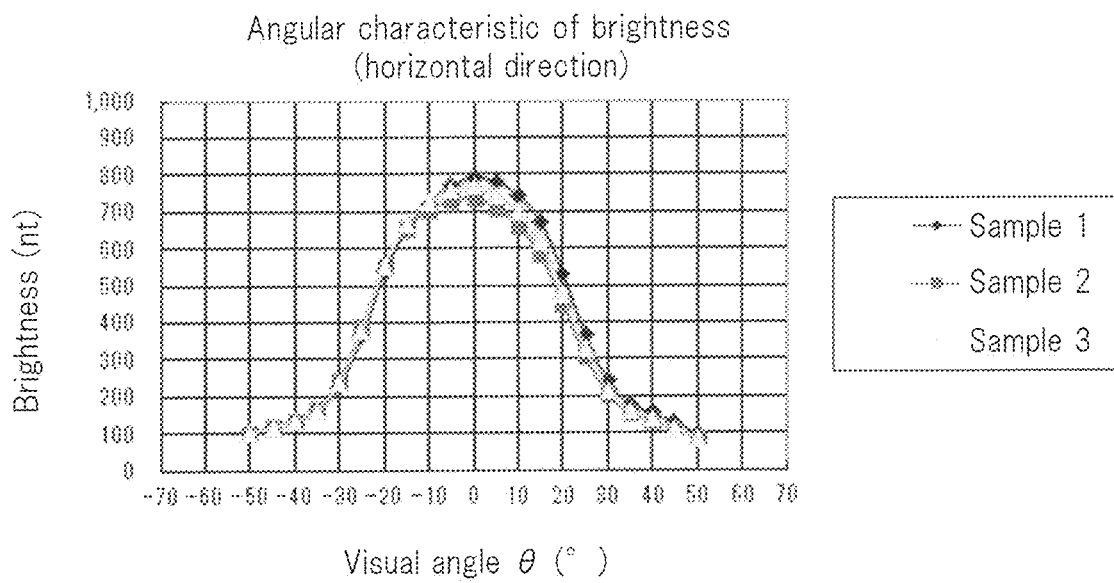
FIG. 24 is a characteristic diagram illustrating an angular characteristic of brightness of the screen in the horizontal direction in a case where white is displayed on the liquid crystal panel.
Figure 25:
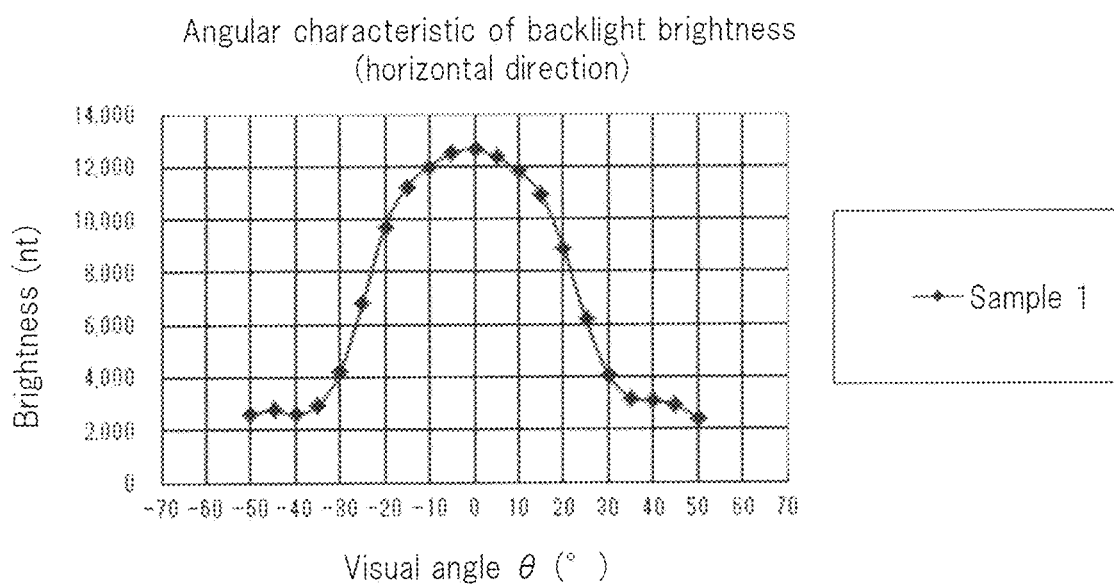
FIG. 25 is a characteristic diagram illustrating an angular characteristic of backlight brightness in the horizontal direction of the liquid crystal panel.
Figure 26:
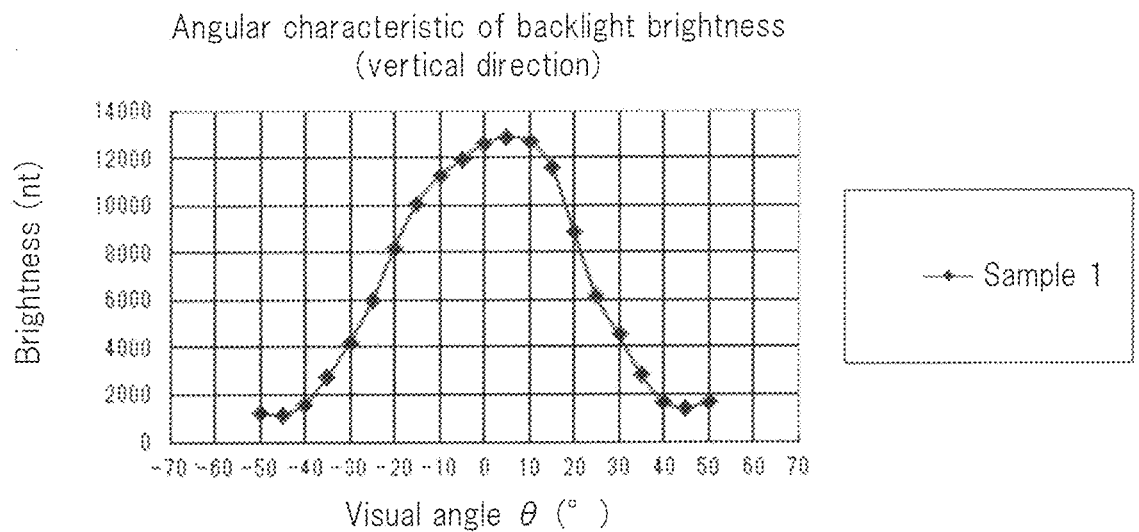
FIG. 26 is a characteristic diagram illustrating an angular characteristic of backlight brightness in the vertical direction of the liquid crystal panel.
Figure 28:
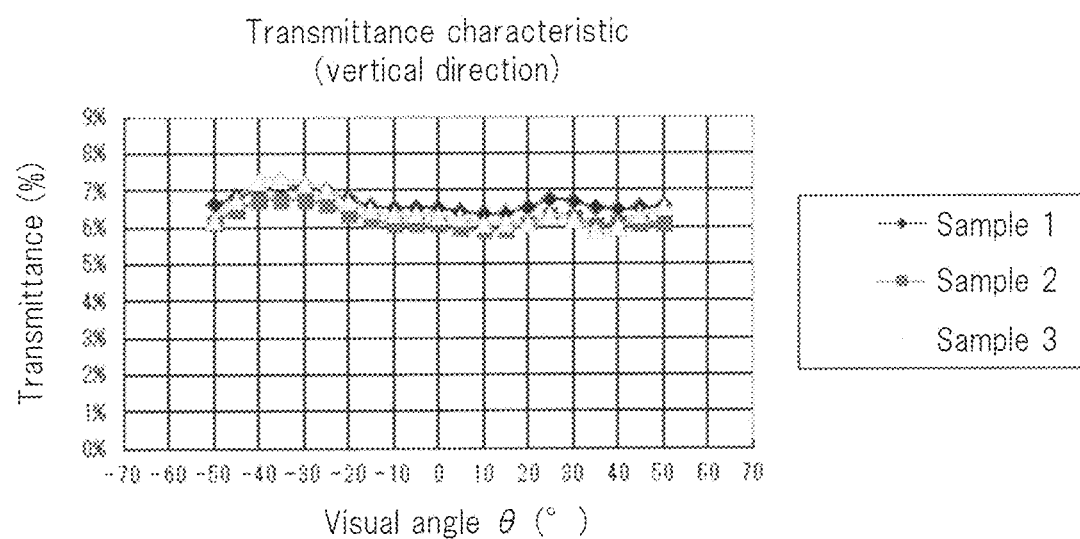
FIG. 28 is a characteristic diagram illustrating a transmittance characteristic of the liquid crystal panel in the vertical direction.
Figure 29:
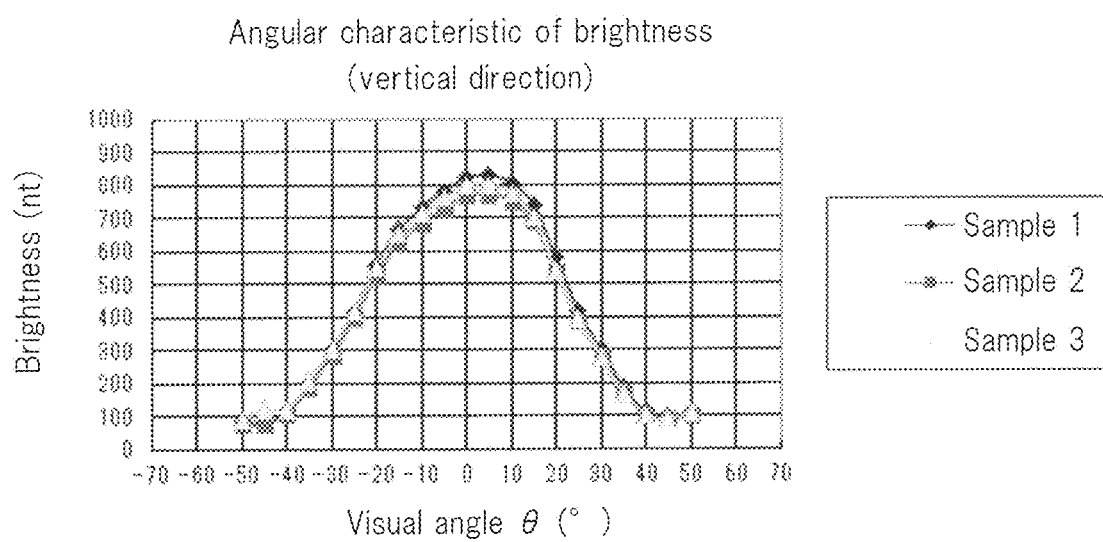
FIG. 29 is a characteristic diagram illustrating an angular characteristic of brightness of the liquid crystal panel in the vertical direction.
Figure 30:
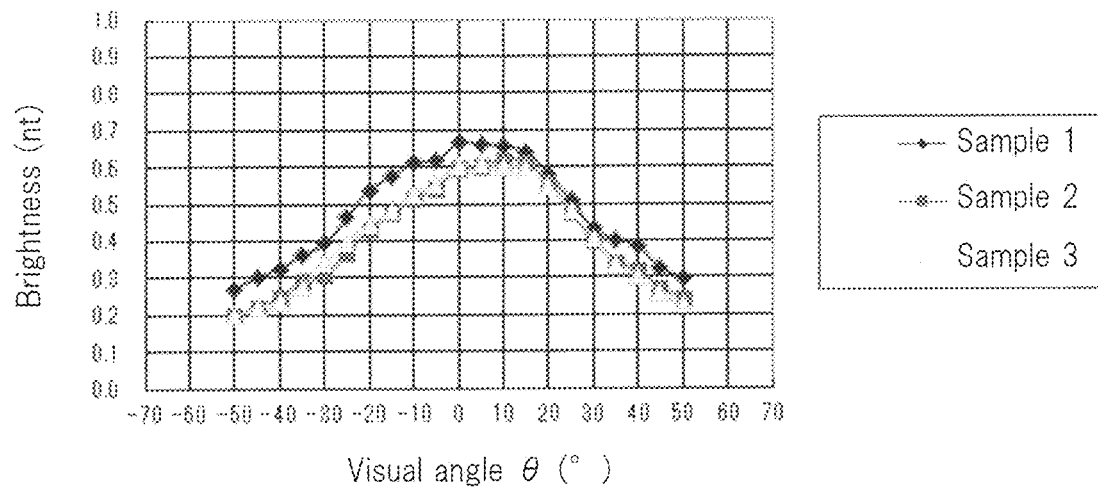
FIG. 30 is a characteristic diagram illustrating an angular characteristic of black display brightness in the horizontal direction of the liquid crystal panel.

The emission light (video light) from the liquid crystal panel that is used as the video display apparatus in the information display apparatus 100 according to the present embodiment indicates predetermined transmittance in a range of ±50° as shown in FIG. 23 and FIG. 28 in a case where visual angles in horizontal and vertical directions are used as a parameter (see FIG. 22). In a case where a range of the visual angle falls within ±40°, it is possible to obtain a better transmittance characteristic. As a result, as shown in FIG. 24 and FIG. 29, brightness of the screen greatly varies depending upon a direction to view the screen (visual angle) in the horizontal direction and the vertical direction of a display screen. This is caused by an angular characteristic of backlight brightness shown in FIG. 25 and FIG. 26.

For this reason, the inventors obtained high brightness by controlling the angle of the totally reflecting surface of the light guide element 18 and the divergent angle of the light source light from the LEDs of the light funnels 21 to 24 to narrow visual angle property of the backlight into a small range so that the emission light from the liquid crystal panel 4, which is taken in the virtual image optical system, can be obtained as light vertical to the screen as much as possible. Specifically, as shown in FIG. 24 and FIG. 29, in order to obtain video with high brightness, light in a range of ±30° in a right-and-left viewing angle is used, and contrast performance shown in FIG. 27 and FIG. 31 is considered.

By narrowing it to ±20° or smaller, the virtual image using a source image with good image quality could be obtained at the same time.

As mentioned above, the contrast performance that influences the image quality of the video display apparatus is determined by to what extent brightness when black as a basis to determine image quality is displayed (in FIG. 30 and FIG. 32, indicated by "black display brightness") can be lowered. For this reason, it is preferable that an iodine-based polarizing plate in which the degree of polarization is high is used between the liquid crystal panel 4 and the backlight.

On the other hand, by using a dye-based polarizing plate as a polarizing plate provided at the optical element 2 side (light emission surface), it is possible to obtain high reliability even in a case where outside light enters therein or ambient temperature is high.

In a case where color display is executed in the liquid crystal panel 4, color filters corresponding to the respective pixels are provided. For this reason, in a case where light source color of the backlight is white, light absorption with the color filters becomes greater, and loss thereof becomes larger. Thus, as shown in FIG. 17 described above, the inventors use a plurality of LEDs:

(1) to add a green LED whose contribution to brightness is large compared with the case where a plurality of white LEDs is used.
(2) to add a red or blue LED to the white LED to improve glossy property of an image.
(3) to individually arrange red, blue, and green LEDs, add a green LED whose contribution to brightness is large, and individually drive the LEDs, thereby enlarging a color reproduction range to heighten glossy property as well as to improve brightness.
(4) to raise transmittance of each color filter with respect to peak brightness of red, blue, green LEDs by implementing the above (3) to improve brightness as a whole.
(5) to reduce damage of the polarizing plate at an incident side of the liquid crystal panel as a second embodiment of the backlight by arranging the PBS between the light funnels and the light guide element to uniform it to a specific polarized wave.

It goes without saying that a polarization direction of the polarizing plate that is arranged at the incident side of the liquid crystal panel may be a direction through which the polarized wave uniformed to a specific direction after passing through the PBS (Polarizing Beam Splitter) passes.

As mentioned above, as the video display apparatus 4 according to the embodiment of the present invention, a λ/4 plate can be provided on the emission surface of the liquid-crystal display panel to convert the emission light to circular polarized light. As a result, the driver is allowed to monitor a good virtual image even though he or she wears polarized sunglasses.

Moreover, by forming reflection coating for the reflecting mirror used in the virtual image optical system by metallic multilayer, angular dependence of reflection power is small, and the reflection power is never changed by a polarization direction (a P wave or S wave). Therefore, it becomes possible to uniformly keep chromaticity and brightness of the screen.

Moreover, in a case where an ultraviolet ray reflecting film or an optical member obtained by combining the ultraviolet ray reflecting film and an infrared ray reflecting film is provided between the virtual image optical system and the windshield, temperature rise of the liquid-crystal display panel and the polarizing plate and damage therefrom can be reduced even though outside light (solar light) enters it. Therefore, an effect that reliability of the information display apparatus 100 is not impaired can be obtained.

Further, in the virtual image optical system, optimum design including a difference between the radius of curvature in the horizontal direction and the radius of curvature in the vertical direction of the windshield that is the projected member in the conventional technique in the vehicle is carried out. The concave mirror 1 whose concave surface faces the windshield 6 side is arranged between the windshield 6 and the video display apparatus 4 or an intermediate image display unit. This causes video of the video display apparatus 4 to be enlarged, and the video is reflected by the windshield 6. At this time, the optical element is arranged between the concave mirror 1 described above and the video display apparatus 4. On the other hand, video light flux to form an enlarged image (virtual image) of the video, which is formed so as to correspond to a viewpoint position of the driver, passes through the optical element arranged between the concave mirror 1 and the video display apparatus 4, thereby correcting distortion and/or aberration that occurs in the concave mirror 1. For that reason, a virtual image in which distortion and aberration are reduced significantly can be obtained compared with the virtual image optical system including only the conventional concave mirror.

Moreover, in the configuration according to the present embodiment shown in FIG. 1, it is necessary to form a virtual image obtained by being reflected at the upper portion of the windshield 6 (that is, an upper portion in a vertical direction of the vehicle body) at a far position. For this reason, in order to favorably form the video light flux diverged from the upper portion of the video display apparatus by which the video corresponding to this is displayed, it is necessary that a focal point distance f1 of the optical element arranged between the concave mirror 1 described above and the video display apparatus 4 is made shorter, and to the contrary, the virtual image obtained by being reflected at the lower portion of the windshield 6 (that is, a lower portion in a vertical direction of the vehicle body) is formed in the vicinity thereof. For this reason, in order to favorably form the video light flux diverged from the lower portion of the video display apparatus by which the video corresponding to this is displayed, a composite focal point distance f2 of a plurality of optical elements arranged between the concave mirror 1 described above and the video display apparatus 4 may be set to be relatively longer.

Further, in the present embodiment, the radius of curvature in the horizontal direction (parallel to the ground) of the windshield 6 is different from the radius of curvature in the vertical direction (that is, a direction vertical to the horizontal direction of the windshield), whereby screen distortion of the virtual image viewed by the driver is corrected. Therefore, by arranging the optical element whose axis symmetric property is different with respect to the optical axis in the virtual image optical system, correction of the distortion described above is achieved.

As described above, the sheet-like light source apparatus suitable to be used for an electronic apparatus provided with the image display device according to various embodiments of the present invention has been described. However, the present invention is not limited to the embodiments described above, and various modifications are contained. For example, the whole system has been explained in detail in the embodiments described above for explaining the present invention clearly. The present invention is not necessarily limited to one that includes all configurations that have been explained.

Further, a part of the configuration of one embodiment can be replaced by a configuration of the other embodiment. Further, a configuration of the other embodiment can be added to a configuration of one embodiment. Moreover, a part of the configuration of each of the embodiments can be added to the other configuration, deleted or replaced thereby.

REFERENCE SINGS LIST

100 . . . information display apparatus, 101 vehicle, 1 . . . concave mirror, 2 . . . optical element, 4 . . . video display apparatus, 4A, 4B . . . liquid-crystal display panel, 5A, 5B . . . backlight light source, 6 . . . 10 projected member (windshield), 7 . . . housing, V1 . . . virtual image, 8 . . . EyeBox (eyes of observer), 9 . . . light source unit, R1 . . . upper video light, R2 . . . central video light, R3 . . . lower video light, 10 . . . flexible board, 11 . . . video display surface, 12 . . . frame, 13 . . . fin, 14 . . . diffusing member, 16 . . . exterior member, 17 . . . emission surface, 18 . . . light guide element, 20 . . . light funnel unit, 21 to 24 . . . light funnel, 36 . . . emitted ray from liquid crystal panel.

The invention claimed is:

1. An information display apparatus configured to display video information of a virtual image on a reflecting surface of conveyance, the information display apparatus comprising:
a display configured to display the video information; and
a virtual image optical system configured to display a virtual image at a front of the conveyance by reflecting light emitted from the display by means of the reflecting surface,
wherein the virtual image optical system includes a concave mirror and an optical element,
wherein the optical element is arranged between the display and the concave mirror, and is configured to correct distortion of the virtual image obtained so as to correspond to a viewpoint position of a driver on a basis of a shape of the concave mirror and a shape of the optical element,
wherein the information display apparatus further comprises a virtual image double image conversion reducer configured to reduce double image conversion of the virtual image, the double image conversion occurring due to reflection of a video light flux with a front surface and a back surface of the reflecting surface, and
wherein the virtual image double image conversion reducer is configured so that to reduce aberration that occurs outside a main ray in the virtual image optical system, a ray passing through an upper peripheral portion of a pupil among a video light flux that converges in an image point of a virtual image surface by the video light flux from respective object points of video light from the display travels toward an inside of the main ray.

2. The information display apparatus according to claim 1,
wherein the optical element has a shape in which refractive power by an optical path passing through the upper peripheral portion becomes relatively stronger compared with refractive power by an optical path through which the main ray passes.

3. The information display apparatus according to claim 1,
wherein in a case where the information display apparatus is arranged under the reflecting surface to reduce a double image that is generated by a difference between ordinary light reflected by an interface between the reflecting surface and an interior of the conveyance and extraordinary light reflected by an interface between the reflecting surface and an exterior of the conveyance, relative refractive power of a virtual image optical system through which a ray passing through an upper portion than a center of an incident eye passes is set to be smaller than relative refractive power of a virtual image optical system through which a ray passing through a lower portion than a center of the other incident eye passes so that aberration occurs below the main ray of the virtual image optical system.

4. The information display apparatus according to claim 1,
wherein the virtual image optical system includes an optical element with weak negative refractive power, and the optical element with weak negative refractive power is configured to emit, video light from the display is focused on and made incident on the optical element to become substantially parallel light, the substantially parallel light toward the concave mirror.

5. The information display apparatus according to claim 1,
wherein the virtual image optical system includes an optical element with weak positive refractive power, and the optical element with weak positive refractive power is configured to emit, after video light from the display is diverged and made incident on the optical element to become substantially parallel light, the substantially parallel light toward the concave mirror.

* * * * *